United States Patent [19]

Nelson et al.

[11] Patent Number: 4,598,397
[45] Date of Patent: Jul. 1, 1986

[54] MICROTELEPHONE CONTROLLER

[75] Inventors: Gary A. Nelson, Irvine; Patrick N. Godding, Tustin, both of Calif.

[73] Assignee: CXC Corporation, Irvine, Calif.

[21] Appl. No.: 582,069

[22] Filed: Feb. 21, 1984

[51] Int. Cl.⁴ .............................. H04J 3/12; H04J 3/22
[52] U.S. Cl. ...................................... 370/110.1; 370/84
[58] Field of Search ................. 370/60, 94, 58, 110.1, 370/84, 89

[56] References Cited

U.S. PATENT DOCUMENTS

| | | |
|---|---|---|
| 3,961,139 | 6/1976 | Bowman et al. . |
| 4,019,176 | 4/1977 | Cour et al. . |
| 4,251,880 | 2/1981 | Baugh et al. . |
| 4,271,507 | 6/1981 | Gable et al. . |
| 4,293,948 | 10/1981 | Soderblom ............................ 370/90 |
| 4,375,681 | 3/1983 | Abbott et al. ......................... 370/84 |
| 4,377,860 | 3/1983 | Godbole ................................ 370/84 |
| 4,408,323 | 10/1983 | Montgomery ........................ 370/60 |
| 4,445,213 | 4/1984 | Baugh et al. ......................... 370/60 |
| 4,528,661 | 7/1985 | Bahr et al. . |

Primary Examiner—Douglas W. Olms
Assistant Examiner—Curtis Kuntz
Attorney, Agent, or Firm—Knobbe, Martens, Olson & Bear

[57] ABSTRACT

A large scale integrated circuit device is disclosed that can be used as a component in a variable bandwidth branch exchange system or for other applications utilizing programmable serial data rate conversion. The device can be a serial information interface between a system node and the voice and data channels in a telset or other similar data communications device. The device may be controlled and monitored by an external device such as a microprocessor, and can transfer control and status information between the external control device and the system node.

22 Claims, 27 Drawing Figures

PBX MODE FORMATS

RESYNCHRONIZATION OF TERMINAL DATA

MICROTELEPHONE CONTROLLER

BACKGROUND OF THE INVENTION

The present invention relates to the transmission and reception of digital information on multiple lines and at multiple data rates. More particularly, the present invention relates to a device for switching between data communications lines and the like.

As the complexity of data communications networks increases, the need for alternative methods of interfacing the various devices on the networks becomes critical. If one first considers the simplest interconnection between two devices such as two telephones or such as a computer and a terminal, it is evident that a connection between the two devices can be accomplished quite easily. For example, communications can be established between devices with one wire, such as was done with an early telegraph system. Though each device had simultaneous access to the one wire, typically connecting a remote junction box to a central switching location, only one device at a time could use the wire to send messages to other devices. When the device relinquished the line, another device could then use the line to send messages. Since only one device could use the line to send at any one time, the number of messages which could be sent would be quite low. Thus, the data rate of the systems was low. Obviously, some protocol was established for determining which device had the use of the line at any time. Considering the relative simplicity of such a system and the low data rates, and the fact that the system was most likely under the jurisdiction of one entity, such as the telegraph company, the protocol could be as simple as listening to determine whether the line was in use.

When the number of the devices on a system increased and the users became relatively independent, the number of messages to be sent at any one time increased accordingly. A good example of this would be a telephone system. The users in a given area would not all want to be on the same line where each would have to wait until the line to the central switching location was not in use before initiating a message. As was frequently the case, a large number of users could want to send more messages than such a system could handle in a given time frame. Thus, except in areas where this "party line" method was more cost effective and where the number of messages per unit time was low, the "party line" method was replaced with the method of running a communications line from each telephone or other communications device to a central location, thereby replacing the common line to the remote junction box. At the central location, a communications line from one device could be connected to the communications line from another device to which communications was to be established. This could be done manually as with an operator at switchboard, electromechanically such as in a complex telephone crossbar system, or under computer control as is done in modern telephone networks.

Although the method of running communications lines from each user to a central location has many advantages over the party line method, it has the distinct disadvantage of requiring a communications line from each device to a central location. Thus, although two devices might be relatively close to each other compared to the distance to the central location, communications between the two devices would be routed through the central location. In a large, widespread network this would require substantial expenditures for the communications lines. Furthermore, although a device might only be sending and/or receiving messages during a small portion of a given time frame, a dedicated communications line would be always necessary to connect the device to a central location. During the unconnected time, a valuable resource would be idle. If another device has to be added to an existing system a new dedicated communications line would have to be added to connect the device to the central location. It is obvious that this method of interconnecting communications devices has substantial drawbacks when one considers the physical and economical problem of placing the number of communications lines required for a large communications network.

One solution that has developed in the prior art for the problem is the use of time division multiplexing of digital data. Unlike the previously described method, in a system which uses time division multiplexing, a communications line is not provided from each device to a central location. Instead, each device is connected to other devices relatively close to it. Thus, there would be a considerable savings in the number of communications lines needed to interconnect the devices in a network. All the devices in a communications network may be connected in a ring, chain or the like, with each device connected to two other devices, or to one other device in the case of a device at the end of a chain connection. One such ring communication system is described in co-pending U.S. patent application Ser. No. 491,551, still pending for DISTRIBUTED VARIABLE BANDWIDTH SWITCH FOR VOICE, DATA AND IMAGE COMMUNICATIONS filed on May 4, 1983, assigned to the common assignee, the teachings of which are incorporated by reference herein.

Although it might appear that a device would then only be able to communicate with a device to which it has a direct connection, each device can communicate with all other devices connected to the network. The network ring or chain is continuous, with each device either tapping the ring or chain, or forming a part of the ring or chain. It would also appear that the devices are connected much the same as a party line or the previously described telegraph system. Although the devices are physically connected to the same line at any one time, and do not transmit data at the same time, the devices do not have to wait until other devices complete their messages before sending their own messages. Communication between devices can typically be accommodated using only a portion of the time available in each cyclical message frame, thereby allowing the ring to communicate numerous messages within a given period.

Multiple devices may be connected to a communications line in a ring or chain configuration or the like. In order to coordinate communication between devices in a ring there need be only one or two connections to a controlling unit at some point in the ring or chain. That configuration substantially reduces the need for large amounts of cabling directed to the same location. Moreover, the controlling device no longer has to be able to interconnect the lines from each of the message devices and, therefore, may be less complex. When time division multiplexing is employed the communications line is not assigned solely to one device until the completion of a message. Instead, the line is assigned to each device for a relatively short period of time, typically referred to as a time slot. Other devices in the communications network are likewise assigned to time slots. The time slots occur periodically on the communications line, and are repeated at a frequency such that the device can send or receive data continuously at its normal data rate. A message frame is comprised of all the time slots available for devices. Since each device is assigned to one or more periodic time slots, each device can continuously communicate on the communications line while other devices are similarly communicating via their assigned time slots. Additional devices can be added to the exemplary system by connecting it in the ring or the like without having to run a new communications line to a central location. Thus, many of the physical and economic constraints are no longer a barrier.

In an exemplary system utilizing time division multiplexing, the communications devices might operate at a data rate of 1000 BPS. A communication line operating at 100,000 BPS would be able to transfer messages to or from this device and 99 similar devices in a message frame which has a 1000 hertz repetition rate. The data from each device would be assigned to each of the 100 one-bit time slots in the message frame. Other configurations could assign the time slots for devices in multiple-bit groups.

In either the centralized network or the ring network, however, devices can only be added to the system if there are time slots available in a message frame. Therefore, it would be difficult, it not impossible, to add the 101st device to the exemplary system if the available time slots are permanently assigned to other devices. In many communications applications the devices present in the system probably would not all be communicating at the same time. Thus, there could be a substantial number of the time slots idle at any given time. However, a typical prior art communications system would not have the flexibility to reassign the idle time slots to additional devices to take advantage of the available time slots. Although increasing the number of time slots would accommodate extra devices, if possible to do so, the incremental increase in the number of time slots might be large compared to the number of devices to be accommodated, and therefore could result in a large number of unused time slots.

Communication of information between data communications devices is typically accomplished with digital data. Essentially, the information is transferred between the devices as a stream of information packets which are represented by voltage levels on the communications line. A "bit" is the minimum amount of information which can be represented by either a high or low voltage level. Information is transferred between communications devices as sequential combinations of bits.

A voice signal can be transferred without any appreciable loss of quality as a stream of 64,000 data bits per second (64,000 BPS). The voice signal is sampled at periodic intervals by the sending device; the samples are converted to a digital format; the digital data is transferred to the receiving device as a stream of data bits; and the digital data is converted to a voice signal by the receiving device.

In comparison to an audio signal, the transmission of character information between a computer and a high-speed video terminal can require data transmission rates in the range of 19,200 BPS. If a terminal is used which has graphics capability, the amount of information needed to provide high resolution graphics can require data rates in the range of 10,000,000 to 20,000,000 BPS. On the other hand, a typical teletypewriter terminal might only require data at a rate of 110 to 300 BPS to operate at full capacity.

Typically a data communications network needs to be capable of handling data rates from 110 BPS to 19,200 BPS, and under some circumstances up to 1,000,000 BPS or more. Ordinarily, the transmission of data in the range of 10,000,000 BPS or more is done on dedicated lines and typically would not constitute a part of a data communications network.

Another problem with the typical prior art system utilizing time division multiplexing is that devices operating at different data rates cannot be accommodated. Although the time slot allocations in a message frame might be adequate for most devices in a system, there is often a need for other devices operating at higher or lower data rates. For example, a system might consist primarily of digitized telephones operating at 64,000 BPS. If a typical network is configured to accommodate the telephones, it might not be able to accommodate the communications to and from a terminal device operating at 19,200 BPS. Furthermore, the terminal device might be such that it operates at different rates when communicating with different devices. Thus, a time slot assignment which accommodates a 19,200 BPS data rate would be partially unused if the terminal device were to operate at 9600 BPS or a lower data rate. Similarly, a time slot assigned to a terminal device operating at 9600 BPS would not be able to accommodate the same device operating at 19,200 BPS.

As can be readily seen from the foregoing, the implementation of time division multiplexing in the prior art accomplished a significant savings in physical resources in a typical communications network. However, the prior art systems have serious limitations with regard to flexibility in light of the ever increasing demands on data communications systems, both with regard to increases in the quantity of devices to be connected to a system and with regard to widespread variations in the communications rates used by those devices.

It is in the area of devices adapted to interface variable bandwidth networks and a variety of different communication devices that the present invention finds application. Communications devices may be designed to transfer voice or data information to distant devices. Many times a user at a given location will have both voice and data communications equipment which may be alternately, or simultaneously used. Therefore, it is necessary to provide an interface controller that can accept either or both voice and data information, format information for communication to the network, and synchronize the data rates of that information with the network data rate. Preferably, such an interface controller will have the ability to dynamically modify the bit space allocation assignable to the particular communications device in accordance with the operating requirements of that device. It is also preferable that the interface controller have the ability to communicate control information to and from the network controller.

In contemporary communications systems interconnection of devices that operate with different communications formats and information rates is accomplished through the use of interface devices that perform a specialized function and operate with only one or, at most, a small number of terminal devices. Generally, such interface devices are hardwired with regard to formats and rates, or are manually switchable. Obviously, such generally available devices do not lend themselves to control by a central network controller and do not provide the requisite flexibility in the rapidly expanding communications field.

OBJECTS OF THE INVENTION

It is a principal object of the invention to provide a flexible communication system that can translate a serial information stream that contains time division multiplexed digital data into one or more channels of data for transmission to local devices as asynchronous character oriented data, synchronous terminal data, synchronous PBX data, synchronous digital voice data, or various combinations of the foregoing data.

It is a further object of the present invention to provide a communication system that can receive data from local devices in the aforementioned formats and transmit that data on a serial time division multiplexed data stream.

It is also an object of the present invention to provide a communications system that functions as an interface between a local microprocessor, or other control device, and a time division multiplexed data stream.

It is another object of the present invention to provide a communications system that allows alteration of the data formats and data rates without requiring any manual manipulation of the system.

It is yet another object of the present invention to provide a communications system that can interoperate with a network controller to provide a variable bandwidth of information that may be accumulated elsewhere in the network and interjected into the network signal stream in accordance with the bit space requirement of the accumulated information.

It is still another object of the present invention to provide a communications system that can receive a signal having a variable bandwidth of valid information and communicate that information to interconnected local devices.

SUMMARY OF THE INVENTION

The device described herein may be used as a component in the implementation of a time division multiplexer. The device can receive serial information from a system node and transmit that information to one or more local communication devices as a serial voice and/or serial data stream. In addition, the device can extract control and status information from the serial information stream from the system node and present that information in parallel form to an external microprocessor that can manage information transfer to and from the device to control information transfer to and from the local communications devices.

The device described herein may also receive serial voice and serial data from local communication devices and receive parallel data from the microprocessor, whereupon the device transmits the combined data in serial form to the system node. The device described herein further provides the capability of interfacing between variable bandwidth data communications devices, with the bandwidth and data formats being selectable under external program control.

DETAILED DESCRIPTION OF THE PREFERRED EMBODIMENT

The discussion below initially presents an overview of the functions of the MTC and the relationship of the various signals passing therethrough. After that discussion a more detailed description is given of the components in the MTC that facilitate the specified functions.

Figure 1:
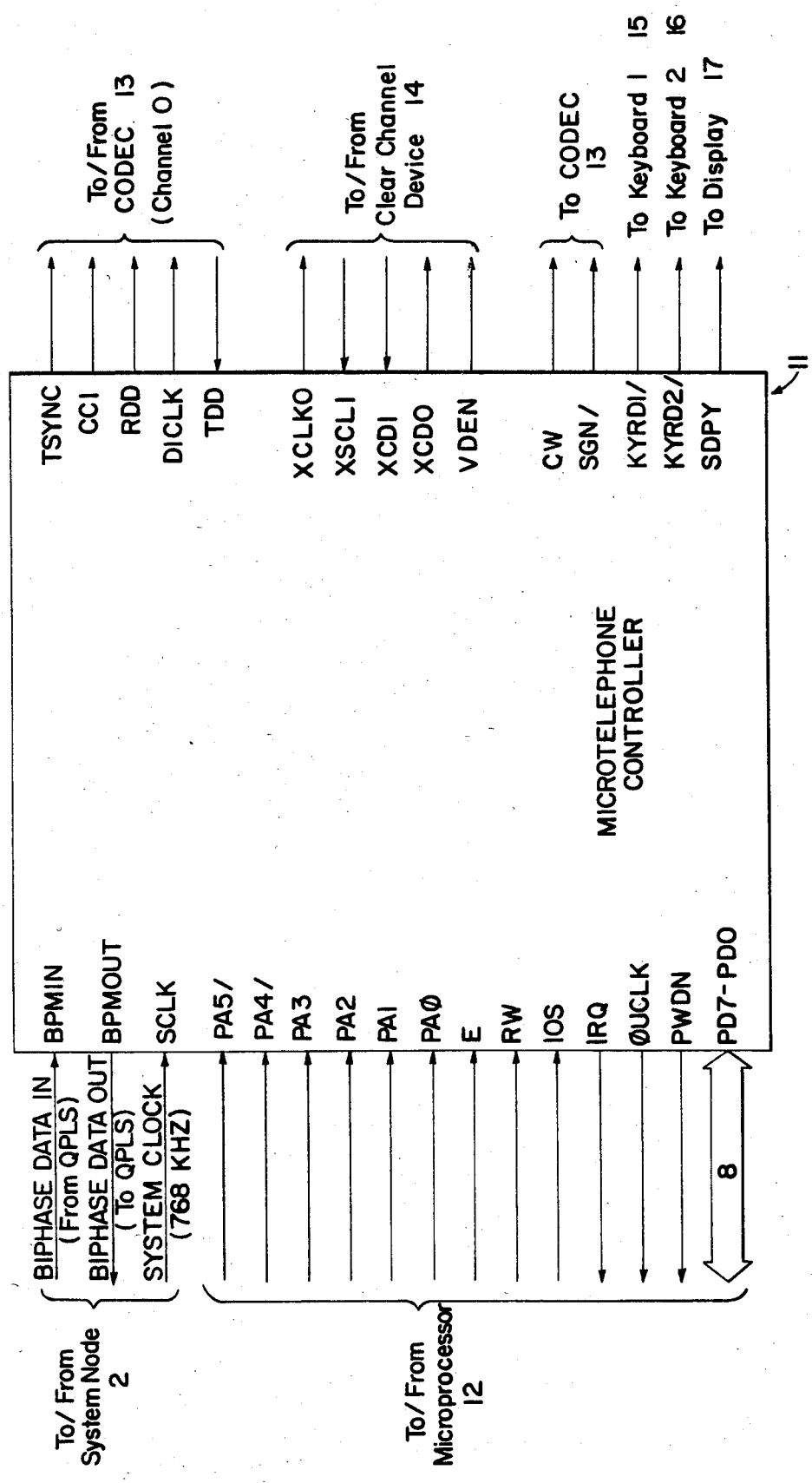
FIG. 1 is a wiring diagram of one implementation of the microtelephone controller (MTC) showing the external connections.
Figure 2:
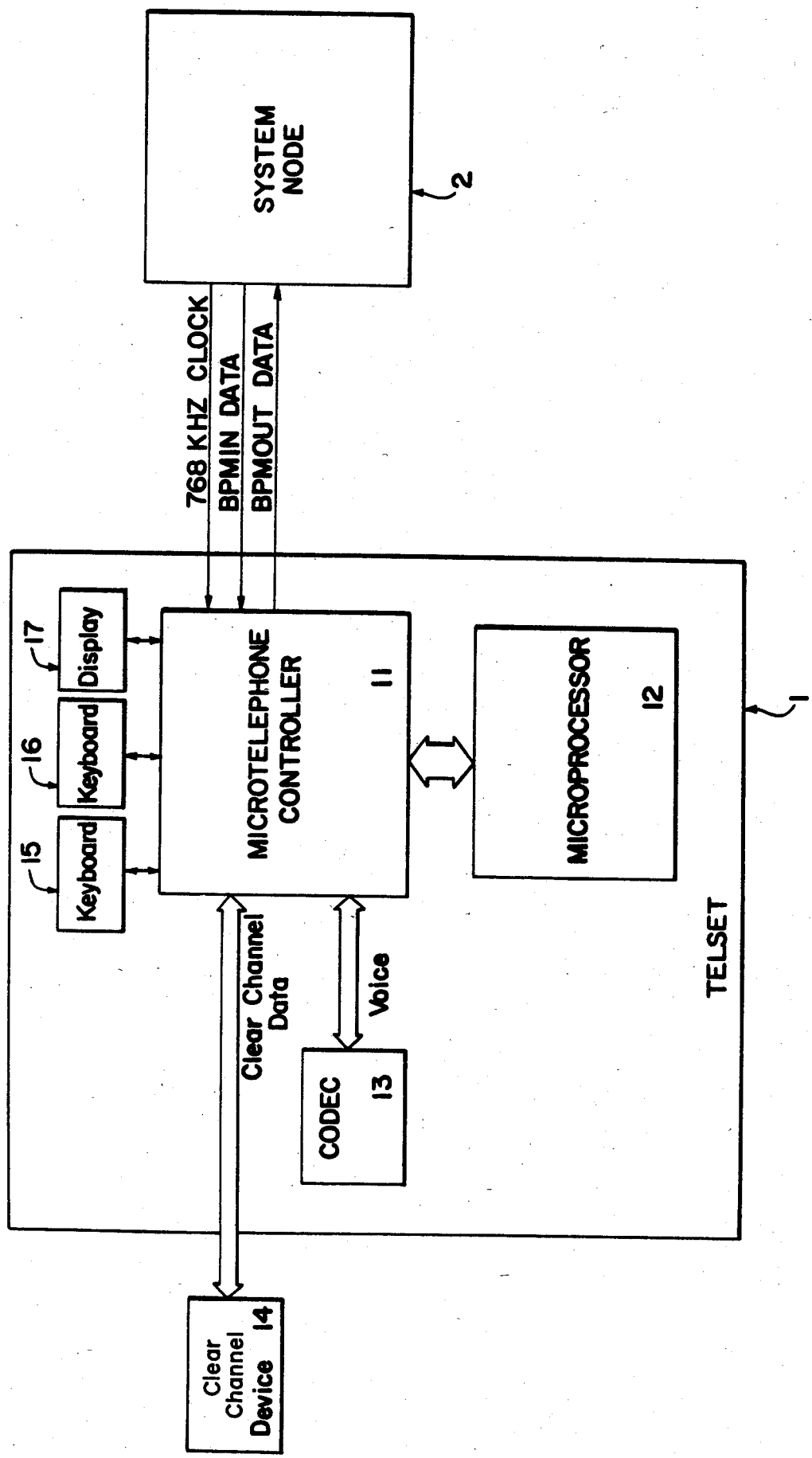
FIG. 2 is a high level block diagram showing a typical implementation of the MTC in a TELSET device.
Figure 3:
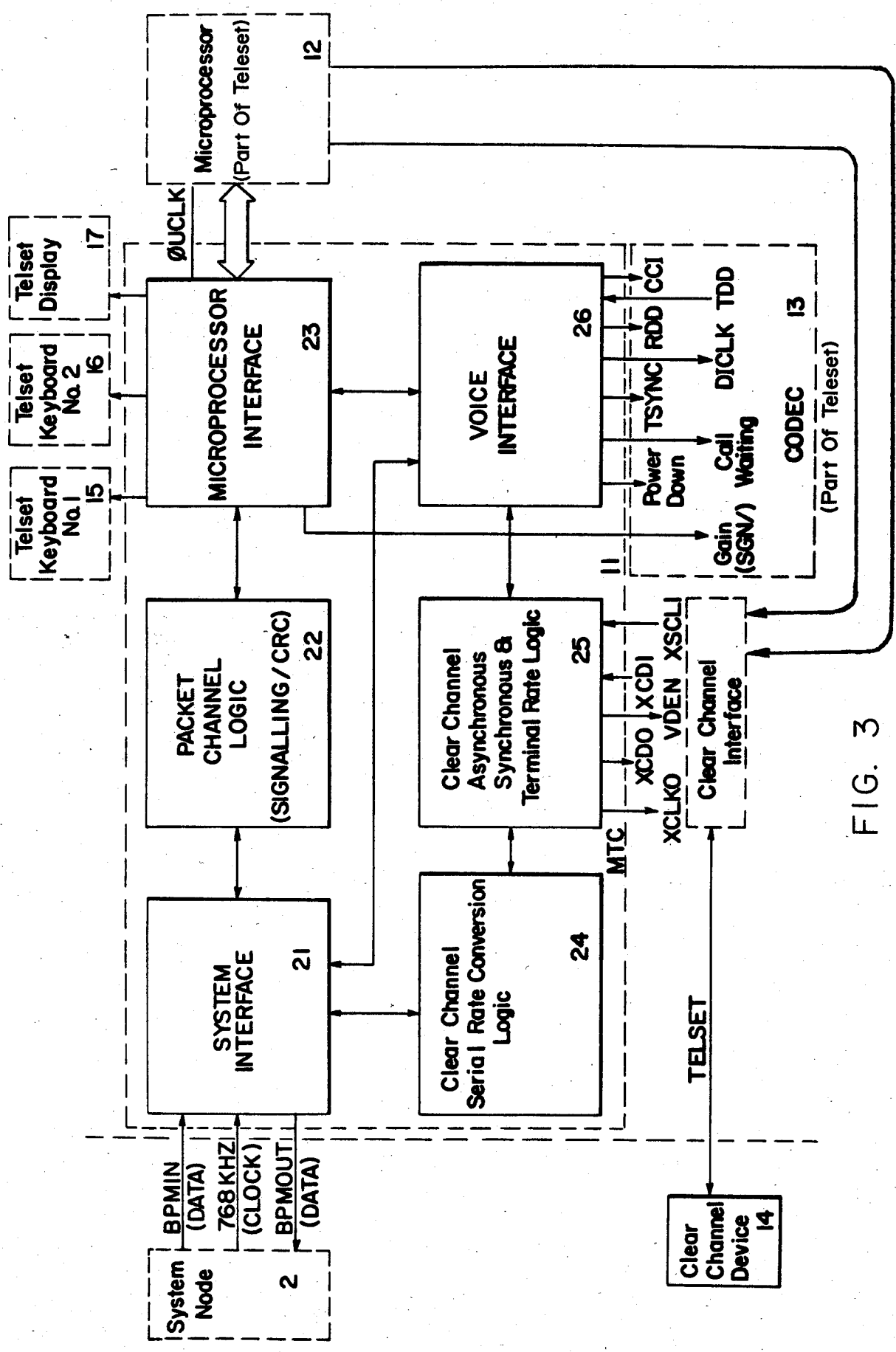
FIG. 3 is a functional block diagram of the MTC.

In a preferred embodiment, the MTC can be a large scale integrated circuit in a 40-pin package. As shown in FIGS. 1, 2, and 3, the MTC 11 may interface with a system node 2, a microprocessor 12, a voice CODEC 13, and a clear channel communications device 14. The MTC can also provide enable signals to other devices such as keyboards 15, 16 and to a display unit 17. The MTC can communicate control information from the system node 2 to the microprocessor 12. Microprocessor commands can, in turn, enable the selected devices to gate data to or from the system node 2 via the MTC.

FIG. 2 illustrates a typical implementation of the MTC 11 and its function as the interface between the system node 2 and the other portions of the TELSET device. The system node 2 may function to interface the TELSET data with the system network, as described in U.S. patent application Ser. No. 491,551 for DISTRIBUTED VARIABLE BANDWIDTH SWITCH FOR VOICE, DATA AND IMAGE COMMUNICATIONS, filed on May 4, 1983. The MTC 11 may receive serial biphase encoded data from the system node 2 and reformat the data, in accordance with internal register configurations for transmission to one or more voice CODEC's 13 and/or to one or more clear channel devices 14. It can also receive serial data from one or more voice CODEC's 13 and/or clear channel devices 14 and can transmit said data to the system node 2 as biphase encoded data simultaneously in both directions (i.e., full-duplex operation). The MTC 11 may also receive parallel address and data information and control from the microprocessor 12 or other control means and generate enable signals to the CODEC's 13, keyboards 15 and 16, and display 17. The MTC 11 may also respond to commands from the microprocessor 12 by reconfiguring its internal registers or by sending internal MTC status information to the microprocessor 12. In a typical implementation, the MTC 11 can also receive parallel control and signalling information from the microprocessor 12 and send that information to the system node 2 in serial form, or receive control and signalling information from the system node 2 in serial form and send that information to the microprocessor 12 in parallel form.

The MTC functional block diagram in FIG. 3 shows the MTC as six functional units although there is not necessarily any distinction in the units in the actual implementation. The system interface 21 can receive the biphase encoded data (BPMIN) and a 768 kHz clock from the system node. The system interface 21 also generates the biphase encoded data out (BPMOUT) to node 2. The serial information stream on BPMIN from node 2 typically has the format shown in FIG. 4(a). In the preferred embodiment, once every 125 microseconds node 2 transmits a 24-bit information frame consisting of a sync bit, seven bits of signal/control information, an eight-bit voice channel and an eight-bit clear data channel. The data is continuous, with the sync bit of one frame following immediately after the last clear data bit of the previous frame.

Figures 4, 5:
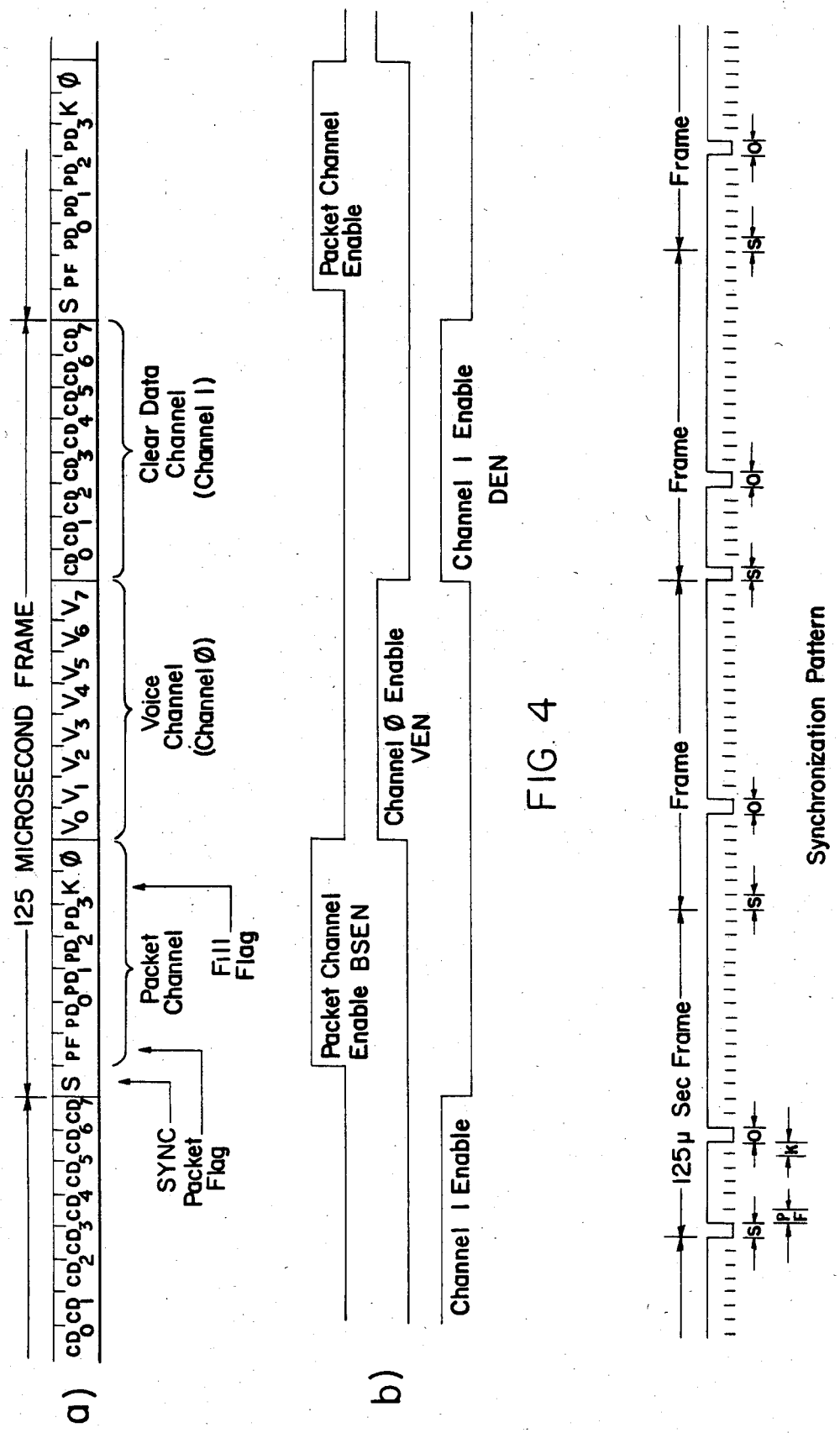
FIG. 4 is a timing diagram exemplifying the relationship between the data format received by the MTC and the internally generated synchronization signals.
FIG. 5 is a timing diagram exemplifying the synchronization pattern of the data received by the MTC in the absence of any information data.

The sync bit, S, alternates between set (1) and reset (0) in each frame. If this synchronization pattern of alternating set and reset in the sync bit is not maintained, the information from the system node 2 is not considered valid and typically is not transmitted on the voice or clear data channel. As shown in FIG. 5, if no messages are being transmitted by the system node 2, the message frames consist of the alternating sync bit with the remaining bits in the frame all 1's except for the eighth bit which is a constant 0.

The system interface 21 converts the biphase, encoded data to nonreturn-to-zero (NRZ) data using well known techniques. That data is then made available to the other functional units within the MTC as set forth below.

Referring again to FIG. 3, the system interface 21 counts the information bits received from the system node 2. The seven bits following the sync bit are the packet channel information bits and are transmitted to the packet channel logic 22 from the system interface 21. The next eight bits are the voice information bits which are typically transferred from the system interface 21 to the voice interface 26. The last eight bits in a frame are the clear channel data bits which are typically transferred from the system interface 21 to the clear channel serial rate conversion logic 24. The system interface 21 typically generates a synchronization signal for each of the three functional subsystems which indicates to the appropriate subsystem that the serial data can be gated to that subsystem. See FIG. 4(b). Thus, the packet channel logic 22 typically responds to data during the packet channel enable (BSEN) time. Voice data is typically enabled to the voice channel output of the voice interface 26 during channel 0 enable (VEN) time. The clear channel asynchronous, synchronous and terminal rate logic 25 responds to data during the channel 1 enable time (DEN).

Figure 6:
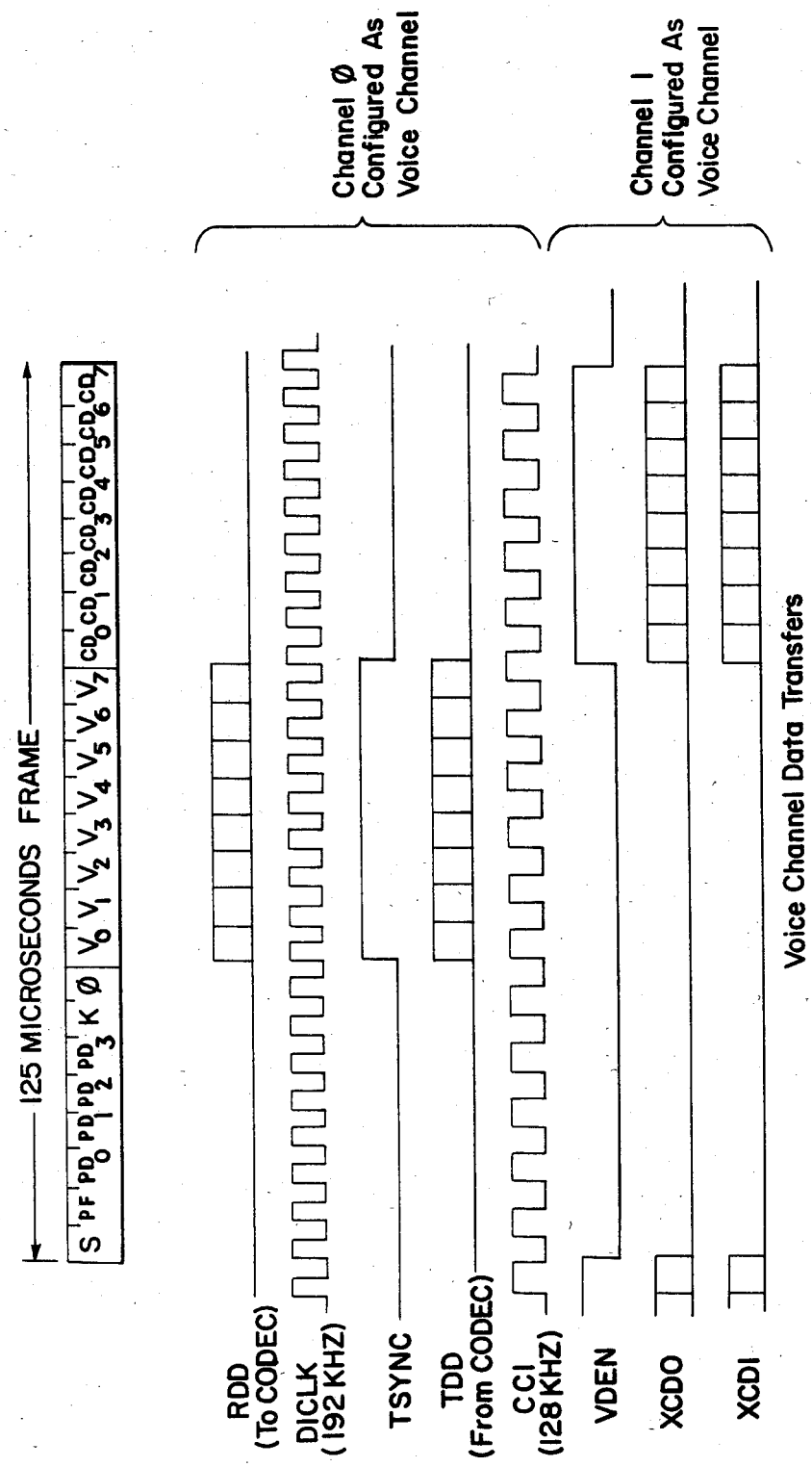
FIG. 6 is a timing diagram exemplifying the relationship between the data from the system node to the voice channel CODEC.

The voice interface 26 need not alter the data received from systems interface 21 before transmitting that data to the CODEC 13. (See FIGS. 2 and 3.) If the voice channel is not disabled, the data received is enabled to the voice data channel output (RDD) (shown in FIGS. 2 and 3) during the channel 0 enable time. The presence of an active signal TSYNC can indicate to the CODEC 13, or other device connected to the voice terminal output (RDD), that the data is valid and should be clocked into its serial input. The signal on TSYNC is typically active only for the eight bit times when the voice data is valid. The voice channel interface 26 provides a 192 kHz clock (DICLK) to synchronize the data out to the CODEC 13. The voice channel interface 26 also provides a 128 kHz CODEC filter clock (CCI). The 128 kHz CODEC filter clock can be used internally by the CODEC 13 for digital filtering. The voice data is clocked out to the CODEC 13 from the voice channel interface 26 on line RDD shown in FIGS. 1 and 3. Voice data is clocked into the voice channel interface 26 from the CODEC 13 on line TDD also shown in FIGS. 1 and 3. The data on RDD and TDD is typically synchronized with DICLK. The foregoing is more clearly described in connection with FIG. 6. Because the voice data to and from the CODEC 13 is typically transmitted and received at the 192 kHz burst rate, it can be transmitted to and received from the CODEC 13 in the same frame time.

The voice interface 26 can also operate in the loopback mode for diagnostic purposes. When configured in that mode, data from the voice interface logic 26 is typically gated back into the voice interface logic 26 without passing through an external device. Data from the external device to the voice interface 26 is disabled in the loopback mode.

Figure 7:
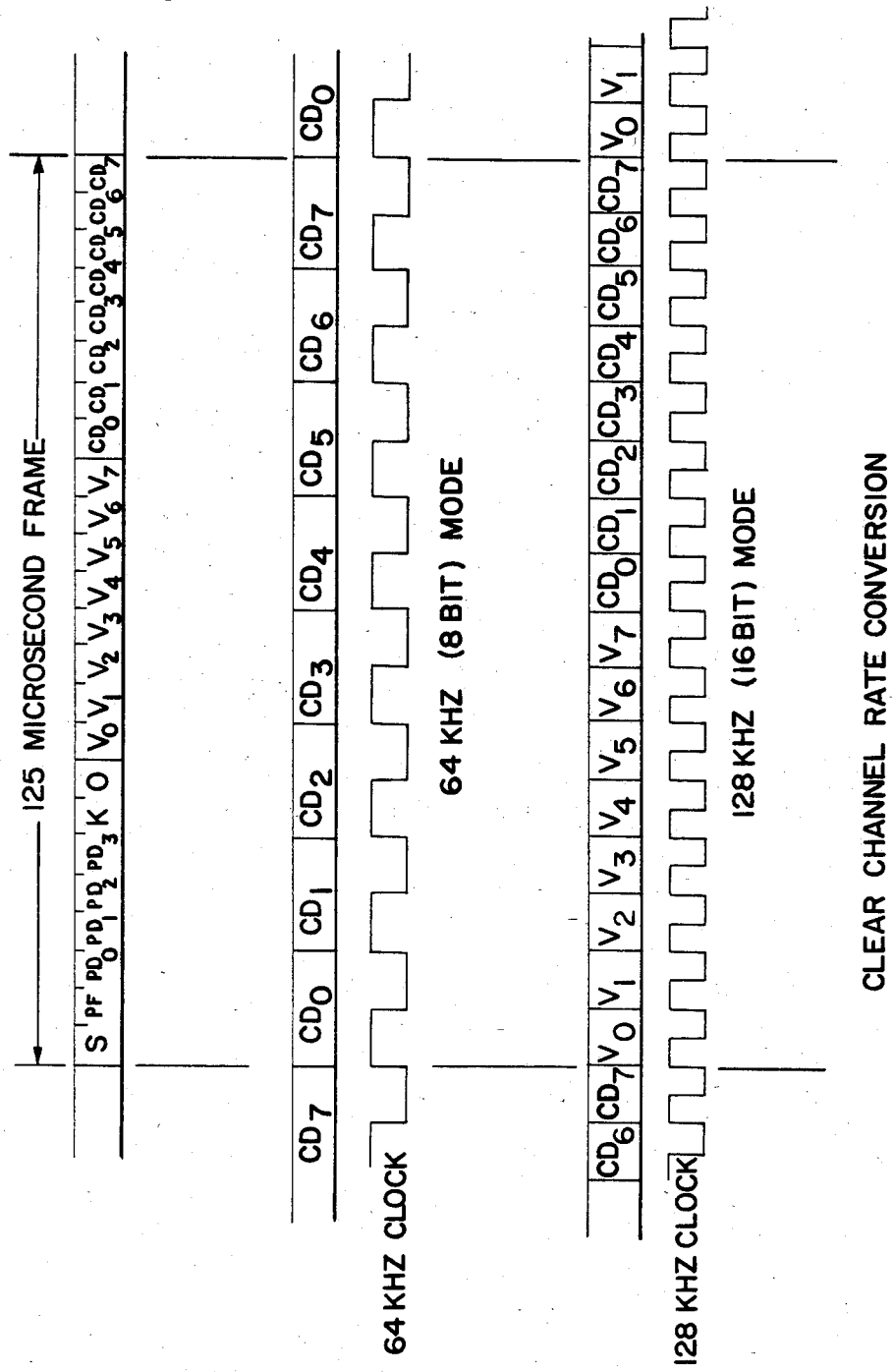
FIG. 7 is a timing diagram exemplifying the relationship between the data received by the MTC from the system node and the internally generated PBX data formats.

The clear channel (channel 1) can be considered to perform at least two separate functions. The first portion of the clear channel logic, the clear channel serial rate conversion logic 24, can provide serial data rate conversion (i.e., convert the clear channel data received from the system node 2 in eight or sixteen bit bursts at 192 kHz into a steady continuous data stream at a lower rate.) The timing associated with that function is illustrated in FIG. 7. In the presently preferred embodiment, data may be received from the system node 2 via system interface 21 at a rate of 192 kHz. Sixteen or eight bits per frame of that data may be intended for the clear channel asynchronous, synchronous and terminal rate logic 25. If the clear channel asynchronous, synchronous and terminal rate logic 25 is configured to be a second voice channel, the data can be transmitted without conversion to the clear channel data output (XCDO). (See FIG. 6). The voice data enable output (VDEN) 74 from the clear channel asynchronous, synchronous and terminal rate logic 25 is enabled during the last eight bits of a message frame. At that time, the data bits are transmitted to the CODEC (not illustrated) connected to the clear channel logic 25 in synchronization with the voice port data clock output (DICLK). Similarly, data can be clocked into logic 25 on the clear channel data input (XCDI) in synchronization with DICLK. Thus, the last eight bits of data in a frame are transmitted to a CODEC unchanged in a 192 kHz burst similar to the operation of the voice channel.

If not configured as a second voice channel, the clear channel serial rate conversion logic 24 can convert the last eight bits of data in a frame, which are received from the system node as part of a 192 kHz data stream, to an eight-bit per frame data stream at 64 kHz. (Eight bits of data at 64 kHz occupies the same 125 microsecond frame as 24 bits of data at 192 kHz.) This 64 kHz data stream is transferred to the clear channel asynchronous, synchronous and terminal rate logic 25 to be transmitted to the clear channel device 14 connected to the external lines, XCLKO and XCDO. Alterntively, the clear channel logic 25 can be configured to receive the entire sixteen bits of data in a frame from the system node. (The voice channel logic would typically be disabled in that mode.) In this mode, the sixteen bits of data can be transmitted to the clear channel asynchronous, synchronous and terminal rate logic 25 from logic 24 at 128 kHz. Data transfer formats for two modes of the clear channel serial rate conversion logic 24 are exemplified in FIG. 7.

Figure 8:
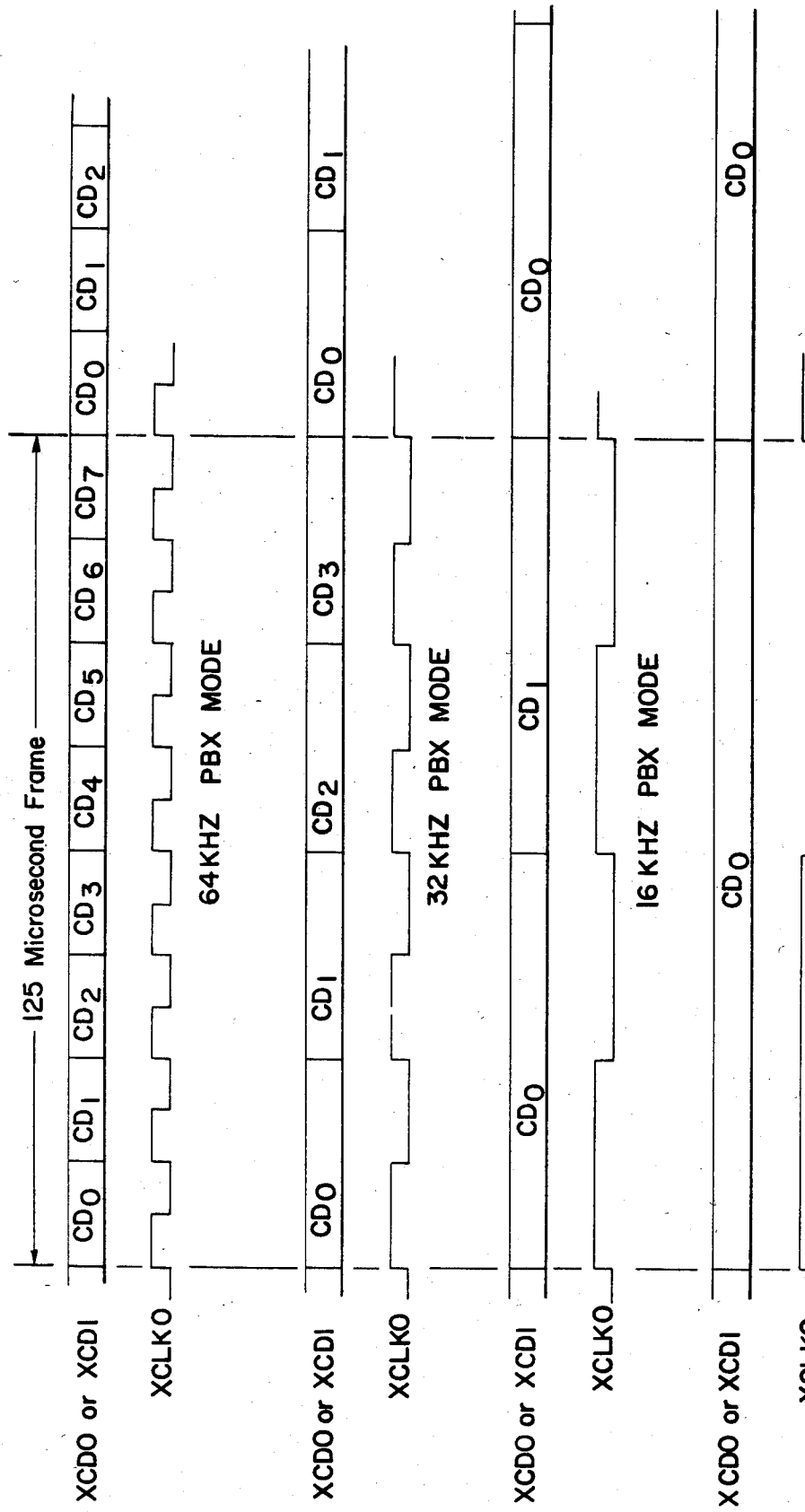
FIG. 8 is a timing diagram exemplifying the relationship between the lower rate PBX data formats and the 64 kHz PBX data formats.

In addition to acting as a second voice channel, the clear channel can also generate data in one of three formats, at multiple data rates for each format. Two of these formats are synchronous and the other format is asynchronous. As previously described, the clear channel asynchronous, synchronous and terminal rate logic 25 receives data from the clear channel serial data rate conversion logic 24 as eight bits of 64 kHz data per frame or as sixteen bits of 128 kHz data per frame. This data can be transmitted directly to the channel 1 output XCDO typically after a delay of one frame. Thus, the data is clocked into the MTC 11 at 192 kHz during one frame and clocked out at the selected PBX data rate on the next frame. In the 128 KHz PBX mode, the sixteen data bits are transmitted to the clear channel device 14 connected to the channel 1 output, XCDO. Similarly, sixteen bits of data can be received from the device 14 in one frame and transmitted to the system node 2 during the next frame. In like manner, eight bits of data can be transmitted in one frame to the device 14 connected to channel 1 output, XCDO, in the 64 kHz PBX mode. The 64 kHz PBX mode is illustrated in FIG. 8. As also shown in FIG. 8, the channel 1 logic 24 and 25 can operate in 8 kHz, 16 kHz or 32 kHz PBX mode. In those modes, one, two or four bits, respectively, per frame are transmitted to and received from the device 14 connected to the clear channel logic 25. Data is clocked out on the data output line, (XCDO), and is clocked in on the data input line, (XCDI) 70. Typically, the output data is clocked out on the falling edges of XCLKO and the input data is clocked in on the rising edges of XCLKO.

Figure 9:
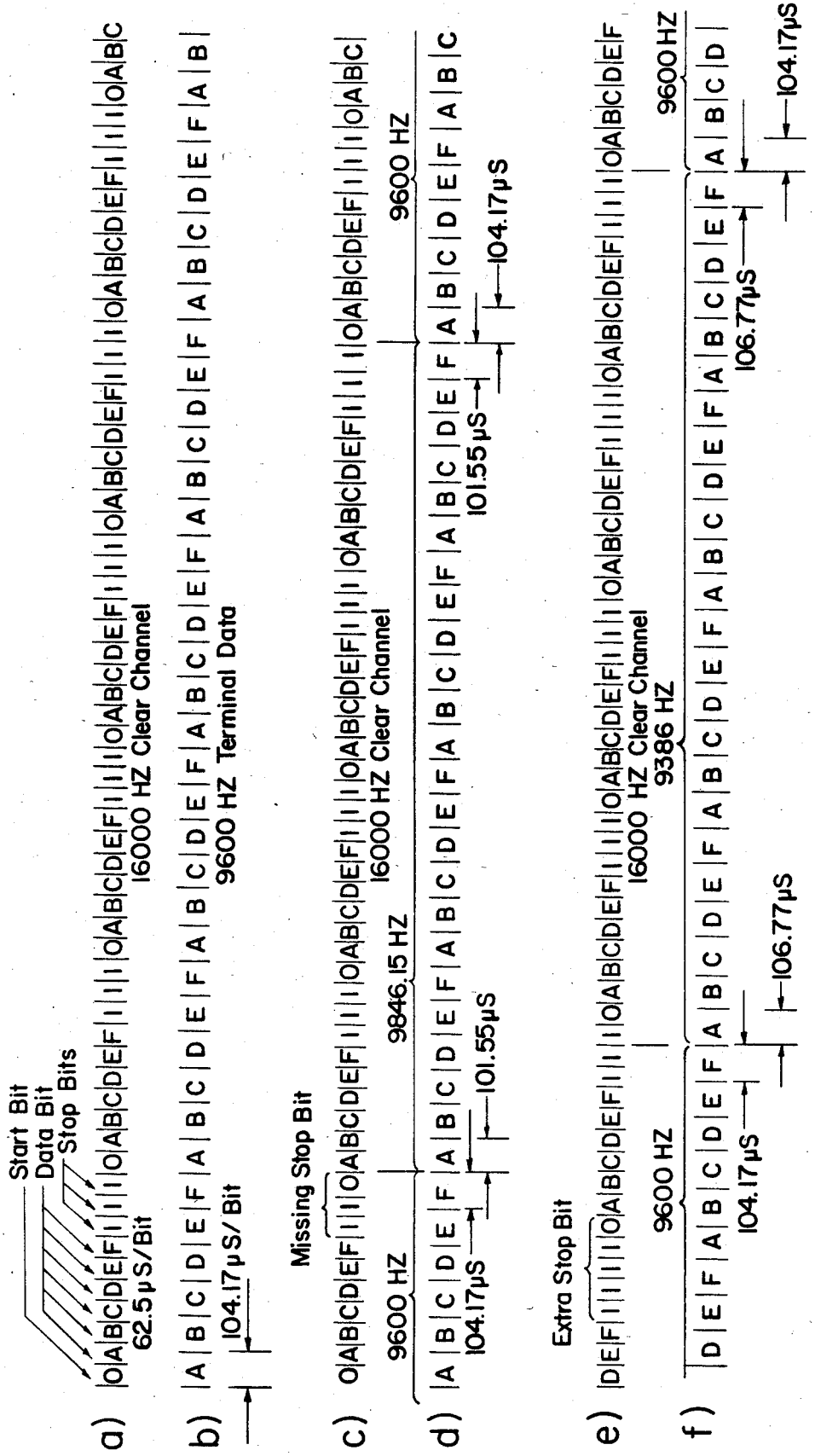
FIG. 9 is a timing diagram exemplifying the resynchronization of terminal data when a missing stop bit or an extra stop bit is received by the MTC.

In the synchronous terminal mode of operation the MTC 11 can receive a character of data from the system node 2. The format of the data character received from the system node is typically a start bit, a six-bit character and three stop bits, for a total of ten bits per character. This is depicted in FIGS. 9(a) and 9(b) which illustrate data received from the system node 2 as 16 kHz data which is to be transferred to the station device 14 as 9.6 kHz data. In the synchronous mode the clear channel asynchronous, synchronous and terminal rate logic 25, shown in FIG. 3, detects the start bit and counts the number of bits until it receives the first stop bit. The start bits and stop bits typically are not used by the device 14 connected to the MTC. The remaining six-bit character can be buffered for the duration of two characters, and then shifted out to the device 14 connected to the channel 1 output XCDO at the selected data rate. The data rate typically can be 19.2 kHz, 9.6 kHz, 4.8 kHz, 2.4 kHz or 1.2 kHz. The output data can be synchronized to the device 14 with the data clock output, (XCLKO).

In the synchronous terminal mode, the data from the device 14 connected to the channel 1 logic 25 is clocked into the MTC with the data clock output, (XCLKO). The synchronous data from the device 14 is continuous; however, the MTC operates with the incoming data as if it were 6-bit characters. After six bits of data are shifted into the MTC, a start bit and three stop bits are typically added to form a character consisting of ten bits. (See FIG. 9(a). The MTC can be programmed to increase or reduce the number of stop bits. That data character is typically transferred to the system interface 21 at the next highest PBX data rate compared to the data rate of the signal from terminal 14. Thus, if the terminal data rate is 9.6 kHz, the data is transferred to the system interface 21 at 16 kHz. Similarly, 19.2 kHz terminal data is transferred at 32 kHz PBX rate. Terminal data at 4.8 kHz, 2.4 kHz and 1.2 kHz is transferred at 8 kHz PBX rate. Data is typically transmitted to and received from the system node 2 at the same rate for any of the various MTC internal PBX modes. The data between the PBX data rate logic and the terminal data rate logic within the clear channel asynchronous, synchronous and terminal logic 25 can be buffered to allow for the varying data rates.

Although the signal to the system node is typically maintained at a constant data rate, i.e. one message frame every 125 microseconds, the valid informational content of the message frame will vary in accordance with the particular data rates of the MTC as interconnected to each given device. At the 32 kHz PBX rate mode, the data is transferred to the system node 2 at four-bits bandwidth per frame. In the 16 kHz PBX node two bits per frame are transferred and in the 8 kHz bandwidth mode one bit per frame is transferred. The system node that receives the variable bandwidth of valid information typically receives programming information indicating the number of valid information bits in each portion of the message frame and can discard the remaining information. System nodes operative to perform that function are described in U.S. patent applications Ser. No. 491,551 for Distributed Variable Bandwidth Switch for Voice, Date and Image Communications, filed on May 4, 1983 and Ser. No. 501,388 for Speakerphone and an application for Quad per Line Switch, filed contemporaneous herewith, all assigned to the common assignee of the present invention. The teachings of those references are incorporated herein. The receiving MTC is configured the same as the transmitting MTC and is interconnected to a device operating at the same speed as the transmitting device. Therefore, the same portion of the message frame that receives valid information is extracted and communicated to the interconnected device.

Referring again to FIGS. 3 and 9, in the synchronous terminal mode where the external device 14 provides the data input clock, data is received from the device 14 on the data input ine (XCDI). The data is clocked into the MTC 11 in synchronization with the terminal data clock (XSCLI). The data is formatted for transmission to the system node 2 as set forth in the foregoing description of the synchronous terminal mode where the data was clocked in using the MTC data clock output.

Since the XSCLI clock may vary with respect to the MTC terminal clock output, potentially the variations in clock rates between the MTC 11 and the terminal device 14 can cause a loss of synchronization and, therefore, a loss of information. If the terminal device clock XSCLI is faster than the MTC terminal clock by a small amount, the data from the terminal device 14 will be received on XCDI at a higher rate than the MTC transfers the data to the system node 2. Similarly, if the terminal device clock is slower, the MTC will be transmitting data to the terminal device 14 at a rate slightly higher than the device 14 can receive it. The clear channel asynchronous, synchronous and terminal rate logic 25 automatically corrects for the variations in the data rate from the terminal device 14 and thereby prevents the loss of any data. The details of the structure provided to monitor and correct for variations in the bit rate is provided below in connection with FIG. 10(d). The discussion immediately below describes the functions performed by that structure upon the occurrence of the stated conditions.

If the external terminal cock on XSCLI 68 is faster than the MTC clock, the clear channel asynchronous, synchronous or terminal rate logic 25 will occasionally send out a character on the 16 kHz clear channel which has a stop bit missing. In other words, the formulated character will consist of a start bit, six character bits, and two stop bits, rather than three stop bits. The start bit of the succeeding character will start in the location where the third stop bit would have been. See FIG. 9(c). In this manner, the MTC is able to continue inputting data at the rate of the terminal. After the character is transmitted, the remaining characters return to the typical mode of one start bit, six character bits and three stop bits per character.

The clear channel asynchronous, synchronous and terminal rate logic 25 in the MTC 11 receiving the data with a missing stop bit, can detect the missing stop bit because the count between start bits will consist of nine rather than ten bits. When the missing stop bit is detected, the clear channel asynchronous, synchronous and terminal rate logic 25 will increase the data clock, XCLKO, to the terminal by a factor which will allow its terminal device 14 to maintain pace with the received data. As illustrated in FIG. 9(d), the clear channel asynchronous, synchronous and terminal rate logic 25 will increase the transmit clock, XCLKO, to the terminal device 14 from 9.6 kHz to 9.84615 kHz for the duration of 24 terminal bit periods. At the end of the 24 terminal bit periods, the data to the terminal device 14 should be caught up with the 16 kHz clear channel data and the transmit clock, XCLKO, to the terminal device 14 is again adjusted to 9.6 kHz. When the next character with a missing stop bit is received, the transmit clock, XCLKO, to the terminal device 14 will again be adjusted for 24 bit periods to re-synchronize with the clear channel data.

If an MTC 11 connected to a terminal device 14 which supplies its own clock does not receive data fast enough from that terminal device 14, the clear channel asynchronous, synchronous and terminal rate logic 25 will occasionally insert an extra stop bit in the ten-bit character being transmitted to the system node. This is illustrated in FIG. 9(e). Thus, the MTC will occasionally transmit a character consisting of eleven bits. When that data stream is received by the receiving MTC 11 elsewhere in the system, the clear channel asynchronous, synchronous and terminal rate logic 25 in the receiving MTC 11 will temporarily adjust the transmit clock, XCLKO, for the data being transmitted to its terminal device 14 to 9.3685 kHz. As seen in FIG. 9(f), after transmitting 24 bits of terminal data at the lower rate, the clock is again adjusted to 9.6 kHz and the data transmitted to the terminal device 14 is again in synchronization with the 16 kHz clear channel data.

The fast clock, which synchronizes the terminal data as illustrated in FIG. 9(d), can be derived from the 768 kHz system clock by first multiplying the system clock by a factor of two to 1.536 MHz and then dividing the times-two system clock by 156 to obtain a 9.84615 kHz signal. The normal data rate clock at 9.600 kHz can be derived in the like manner by dividing the 1.536 MHz by 160. Finally, the slow data rate clock of 9.3685 kHz, which synchronizes the terminal data as illustrated in FIG. 9(f), can be derived by dividing the 1.536 MHz clock by 164. In like manner, if the system is operating at 19.2 kHz, the fast clock can be derived by dividing 1.536 MHz by 78, and the slow clock can be derived by dividing the 1.536 MHz by 82. Since the clear channel data will be received at 32 kHz, the missing or extra stop bits will be compensated for in 24 terminal rate bit periods as was done in the 9.6 kHz mode. It should be clear to those skilled in the art that analogous clock connection schemes using the same or other clock and data rates may be implemented without departing from the scope of the present invention.

The channel 1 asynchronous, synchronous and terminal rate interface logic 25 can also receive data from and transmit data to the terminal device 14 in the asynchronous mode at 19.2 kHz, 9.6 kHz, 4.8 kHz or 2.4 kHz. The data can be typically transmitted and received in message lengths of 6, 7, 8, 9, 10, 11 or 12 bits. In the presently preferred embodiment, the MTC 11 has an internal clock generated by the clear channel serial rate conversion logic 24 which samples the incoming data from the terminal device 14. The sampling of the incoming message is done by using a clock operating at ten times the incoming data rate and synchronizing on the start and stop bits. As with the synchronous terminal data, the data is typically transmitted to the system node at the next higher PBX data rate.

The clear channel asynchronous, synchronous and terminal rate logic 25 can also be configured to operate in the loopback mode. In this mode, the data out of the clear channel asynchronous, synchronous and terminal rate logic 25 is gated into the clear channel asynchronous, synchronous and terminal rate logic 25 for diagnostic purposes. Typically, data is not transmitted to or received from an external device while logic 25 is in the loopback mode.

Packet channel data is communicated between the system node 2 and the MTC 11 in order to monitor the status of the MTC and interconnected devices, to control the flow and format of data in response to the monitored conditions, and to perform other management functions. In the preferred embodiment, packet channel data from the system node 2 is configured according to the convention provided below. It is, however, understood that various other conventions may be implemented without departing from the scope of the invention. Programming information to implement the specified convention is appended to this application and forms a portion of the disclosure.

The packet channel logic 22 monitors the six bits following the sync bit. FIG. 4 illustrates a typical format for the packet data in a frame. If the second bit in an information frame is set (0), the packet flat (PF) is active, indicating that the system node is sending packet data to the MTC. IF the seventh bit, K, is reset (1), the four bits of packet data are active data rather than fill data. If PF is set and K is reset, the packet channel logic 22 will load the four bits of packet data into a shift register in logic 22. When an additional four bits of packet data are received with PF set and K reset, the packet channel logic 22 sets the input ready flag which can be read by the microprocessor 12 by accessing the status register of the MTC. The microprocessor 12 then executes a packet data read to input the data prior to the accumulation of the next eight bits of packet data by the packet channel logic 22. If the microprocessor 12 does not read the packet data within 250 microseconds and the system node 2 has transmitted eight additional bits of data, an overrun flag bit will be set to indicate the occurrence of this condition. Any data received with the packet flag active and the K flag active (set) can be ignored as fill data. When the packet flag goes inactive, the packet channel logic 22 will check a counter to determine whether an even number of four-bit nibbles have been received by the MTC. If an odd number of nibbles are received, the underrun flag can be set to indicate that a complete message was not received.

The packet data received by the MTC 11 with the packet flag active and the K flag inactive is also gated through cyclic redundancy checking logic (CRC) 116 in packet channel logic 22. (See FIG. 10(a).) The last sixteen bits of data (two bytes) received by the MTC 11 prior to the inactivation of the packet flag are typically error-checking bits generated by the CRC in the system node 2. When the inactive packet flag is received, the output of the CRC should be all zeros, indicating that a valid message was received. If the output of the CRC is not all zeros, the CRC error flag is set by the packet channel logic 22 to indicate the occurrence of an error in the received data. Notwithstanding the condition of the CRC outputs, the packet channel logic 22 sets the end of message status bit to indicate to the microprocessor 12 that the message is completed.

Packet data to the system node 2 typically is received by the MTC 11 from the TELSET microprocessor 12 as eight-bit bytes. The eight-bit bytes are typically accumulated in the MTC 11 and then communicated to the system node in four-bit nibbles as packet data. The data to the node is routed through an internal CRC generator described below in connection with FIG. 10(a). If the MTC 11 does not receive an additional eight bits from the microprocessor 12 before the start of the third frame following receipt of the first 8 bits, the packet channel logic 22 typically presumes that the microprocessor 12 has no further data to send to the system node 2. The packet channel logic 22 then sets a busy flag which indicates to the microprocessor 12 that the microprocessor should not send further packet data to the packet channel logic 22. The packet channel logic 22 then appends the internally generated CRC data to the last message sent. Four frames are typically required to send the sixteen bits of CRC data in the four-bit packet data location in the message frames. The busy flag remains set during those four frames and typically for two extra frames following the completion of the transmission. The packet flag is typically inactivated at the end of the sixteen bits of CRC data. The extra two frames of delay are optionally provided to allow the system node 2 to perform any processing which it may require at the end of each message. The MTC packet channel logic 22 need not utilize the K flag for transmission to the system node 2 since it does not have to send fill data. However, in alternative embodiments of the MTC, the K flag can be used to allow the microprocessor 12 to temporarily quit sending data to the MTC 11 without causing the packet channel logic 22 to terminate the message as described above.

Referencing FIGS. 3 and 1, the microprocessor interface 23 can receive parallel data from and send parallel data to the TELSET microprocessor 12 on eight data lines, PD7-PD0. The functions performed by the MTC are typically determined by the address information on lines PA5-PA0, the select lines, IOS, and the read/-write control line, RW. If the address lines and select line from the micrprocessor 12 select the MTC 11, the microprocessor interface logic 23 can cause the MTC to transfer data to (RW=0) or receive data from (RW reset) the microprocessor 12 when the enable line, E, is activated by the microprocessor 12. The microprocessor interface 23 can also respond to certain commands from the microprocessor 12 by generating enable signals to devices connected to the TELSET 1. When an enable signal to an external device is activated, the MTC 11 typically does not receive data from or send data to the microprocessor 12.

DETAILED DESCRIPTIONS OF THE FUNCTIONAL UNITS

A more detailed description of the particular circuits that may be implemented to perform the above mentioned functions of the MTC will be set forth below in connection with FIGS. 10(a)-10(e) and 11.

SYSTEM INTERFACE

Figure 10A:
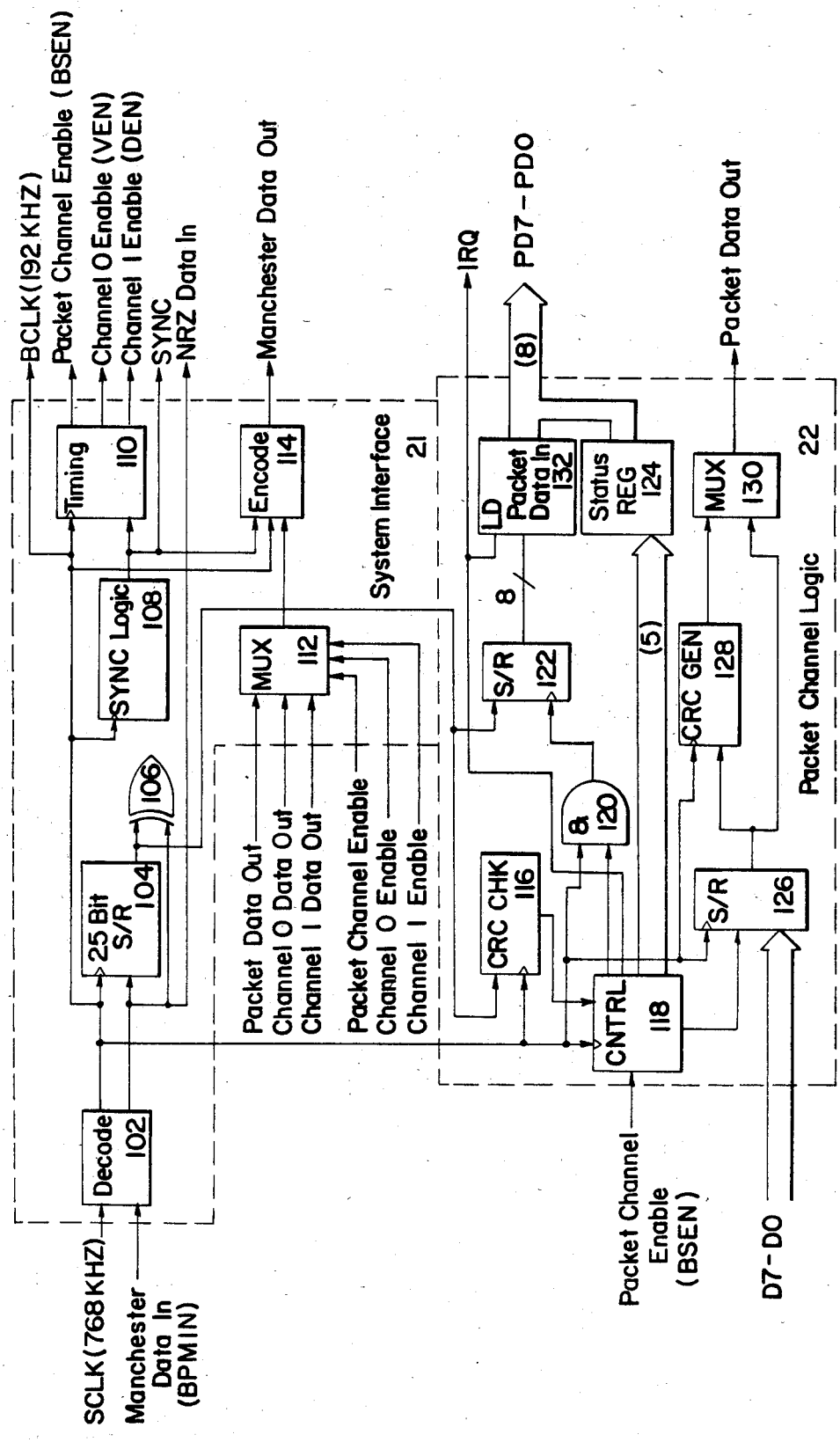
FIGS. 10(a), (b), (c), (d) and (e) are detailed block diagrams of the functional units of the MTC.

FIG. 10(a) shows a detailed block diagram of the system interface 21 and the packet channel logic 22, shown more generally in FIG. 3. Data is received from the system node in the form of biphase mark encoded data, sometimes referred to as biphase Manchester encoded data. The generation and decoding of biphase mark encoded data is well-known in the art. A brief description of the characterization and manner of processing such data is set forth below.

Figure 11:
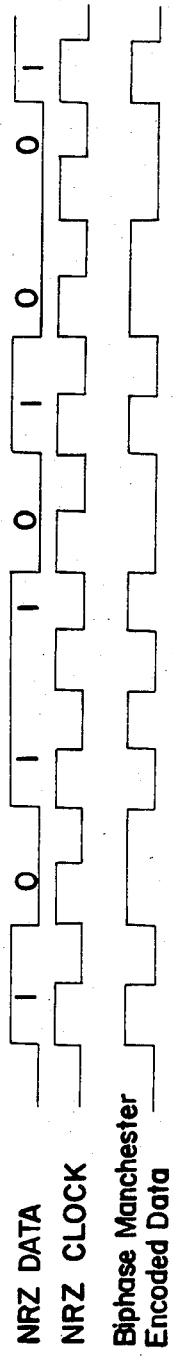
FIG. 11 is a timing diagram showing the relationship between biphase mark encoded data and NRZ data.

As seen in FIG. 11, biphase mark encoded data can be characterized by having at least one data transition per bit period. Nonreturn-to-zero (NRZ) data can be characterized as having the bit value represented by the logic level of the signal throughout the duration of the bit time (i.e., a 1 is represented by a high voltage level and a 0 is represented by a low level). In order to extract the NRZ data, the receiving device typically must also receive a clock or other synchronization signal to define the bit periods. The biphase mark encoded data can be transmitted without a clock since each bit position has at least one transition. If two transitions occur in one bit position, the decode logic 102 of the system interface outputs a logic one in the NRZ format. If only one transition occurs in a bit position, the decode logic 102 outputs a zero in the NRZ format. An NRZ clock is typically generated by the decode logic 102 to synchronize the NRZ data with the MTC logic.

The NRZ data received from the system node is shifted into a 25 bit shift register 104. The twenty-fifth bit of the shift register can be compared with the first bit of the shift register by the exclusive-OR gate 106. When the two bit positions are different, the output of the exclusive-OR is a logic one which indicate that the bit was different in succeeding frames. If this is the first bit position in a frame, the sync logic 108 will output the sync signal that controls the timing chains within the MTC. The timing logic 110 generates three timing signals as shown in FIG. 4. The packet channel enable signal (BSEN) gates the packet data into the packet channel logic 22. The channel 0 (voice) enable (VEN) gates the voice channel data into the voice interface logic 26. The channel 1 (clear channel data) enable (DEN) gates the channel 1 data into the clear channel serial rate conversion logic 24 and into the clear channel asynchronous, synchronous and terminal rate logic 25.

Multiplexor 112 in the system interface 21 can also receive data from the packet channel 22, the voice interface 26 and the clear channel logic 24. That data can be gated out of the MTC through the encode logic 114 as biphase mark encoded data.

PACKET CHANNEL

The packet channel logic 22 receives the NRZ data and clock from the system interface 21. The data is typically gated into the control logic 118 when the packet channel enable signal is active. The control logic 118 detects whether there is an active packet flag (PF) and whether the fill flag is inactive. If both conditions are met, the data is gated into an eight-bit shift register 122 in the packet data in logic 132 through AND-gate 120 at a rate of four bits per frame. When eight bits of packet data are accumulated, the data input ready status bit can be set and an interrupt request can be sent to the microprocessor 12 via the microprocessor interface 23 shown at FIGS. 3 and 10(e). An interrupt is generated once every two frame times, synchronized with the active signal on VEN. If the data byte ready bit occurs in the odd frame, the interrupt will synchronize to it. This adjustment only occurs once (i.e., on the first byte received). The output of shift register 122 is loaded into input register 132. The occurrence of the ready bit informs the microprocessor that it should perform a status read to determine what condition has occurred. The microprocessor reads the packet data input via the microprocessor interface 23 before the accumulation of the next eight-bit byte of data in the packet data logic 22. If the packet data is not read before the accumulation of the next eight bits, the overflow status bit is typically set.

The valid data received by the packet channel is also gated through the CRC checking logic 116. The CRC checking logic 116 accumulates the four bits of data received during each frame in a cyclic redundancy checking circuit. When the data received from the system node has the packet flag reset, the accumulated data in the CRC checker causes the output of the CRC to be zero, indicating that no errors were received in the incoming packet data. If an error was received, the CRC error bit is typically set in the status register 124.

The receipt of the packet data with the packet flag reset can also cause the control logic 118 to set the end of message status bit in the status register 124. If the end of message occurs when only four bits of data have been accumulated in the packet data in logic 122, a message underflow status bit can be set to indicate that an incomplete message was received from the terminal node. The end of message can also indicate to the microprocessor that the last two bytes of data received were the CRC check bytes generated by the system node and can be ignored as packet data.

The packet channel logic 22 can also formulate packet data to be sent to the system node. The eight bits of data from the microprocessor are loaded into shift register 126 and are shifted out through multiplexer 130 at a rate of four bits per frame. The packet flag can be set by the packet channel logic 22 to indicate to the system node that the packet data is valid. The packet data is also routed through a CRC generator 128 which generates and accumulates CRC data to send to the system node 2 at the end of the message.

When the microprocessor does not send an additional eight bits of data within two frames (e.g. 250 microseconds), the control logic 118 typically resets the packet flag going to the system node and enables the output of the sixteen bits of accumulated CRC data from the CRC generator 128 during the next four frames. The control logic 118 can also set the busy status bit in the status register 124 to inform the microprocessor that the MTC cannot receive any further packet data until the completion of the message transfer. The busy flag typically remains set until two frames following the transmission of the CRC data. The fill flag is typically not used in the above-described mode.

In an alternative embodiment, the control logic 118 will set the fill flag when system interface 21 does not receive an output from the microprocessor within 250 microseconds after the previous microprocessor output. The control logic 118 will cause all ones to be sent in the packet channel and will not route the packet data through the CRC generator 128. The packet flag will not be reset in this alternative embodiment until the microprocessor sends a command to the MTC to indicate that the packet flag should be reset.

VOICE INTERFACE

Figure 10B:
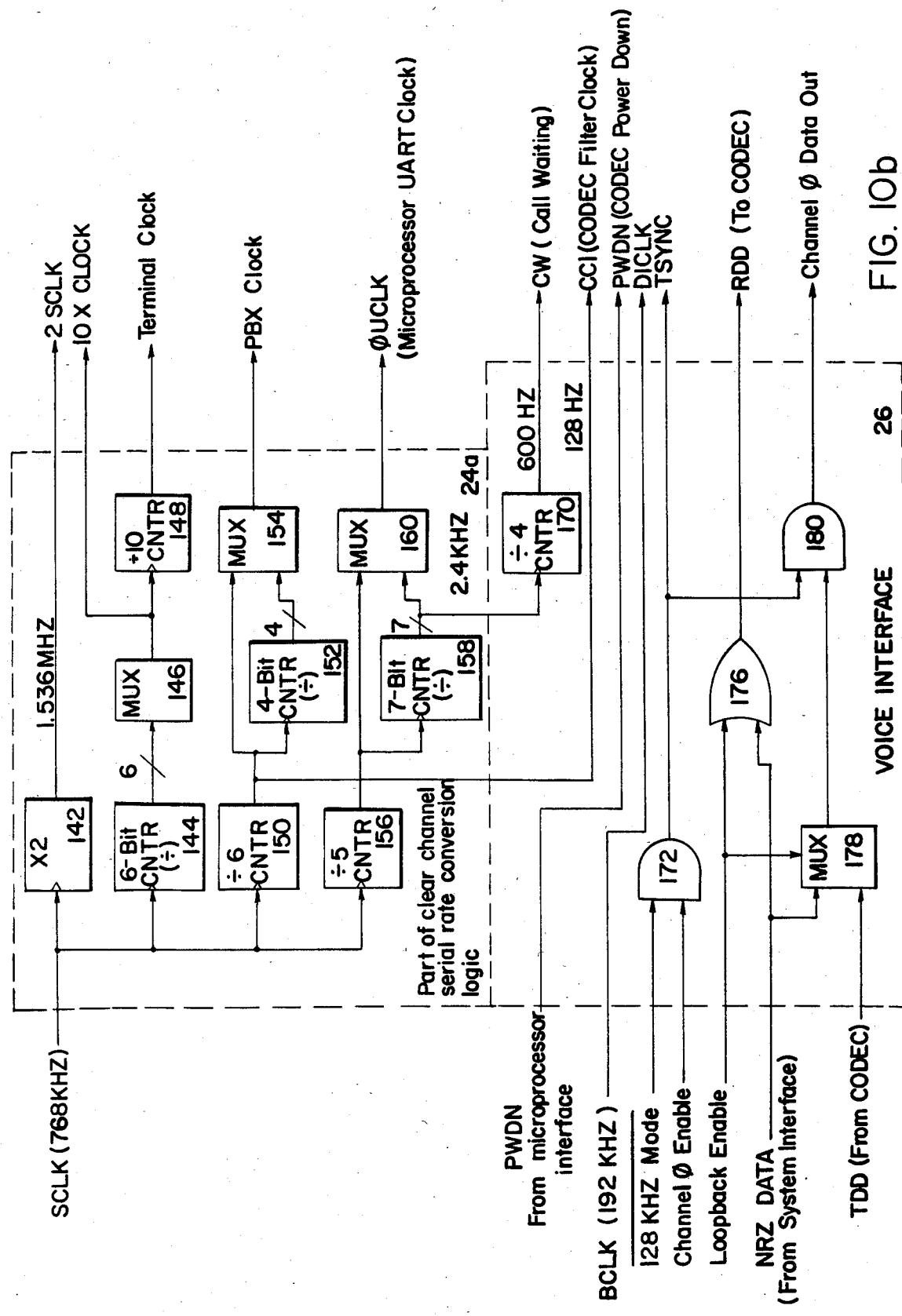

The voice interface logic 26, shown in FIG. 3 and illustrated in more detail as part of FIG. 10(b), can generate signals to the CODEC 13 and transfer data to and from the CODEC 13. If the MTC is not in the 128 kHz PBX mode, the voice interface generates the TSYNC signal during the channel 0 enable time. During the time that TSYNC is active, the CODEC 13 can receive the NRZ data from the system interface on the RDD line using the 192 kHz clock on the DICLK line. The TSYNC signal also causes AND-gate 180 to gate NRZ data from the CODEC 13 (TDD) through multiplexer 178. This data is typically available to the system interface 21 as channel 0 data output to be gated to the system node 2 during the channel 0 time. In the previously described loopback mode, multiplexer 178 selects the NRZ data from the system interface 21 to be gated back to the system interface 21. In the loopback mode, the loopback input to OR-gate 176 typically forces all 1's on the read data line, RDD to the CODEC 13.

CLEAR CHANNEL SERIAL RATE CONVERSION LOGIC

Figure 10C:
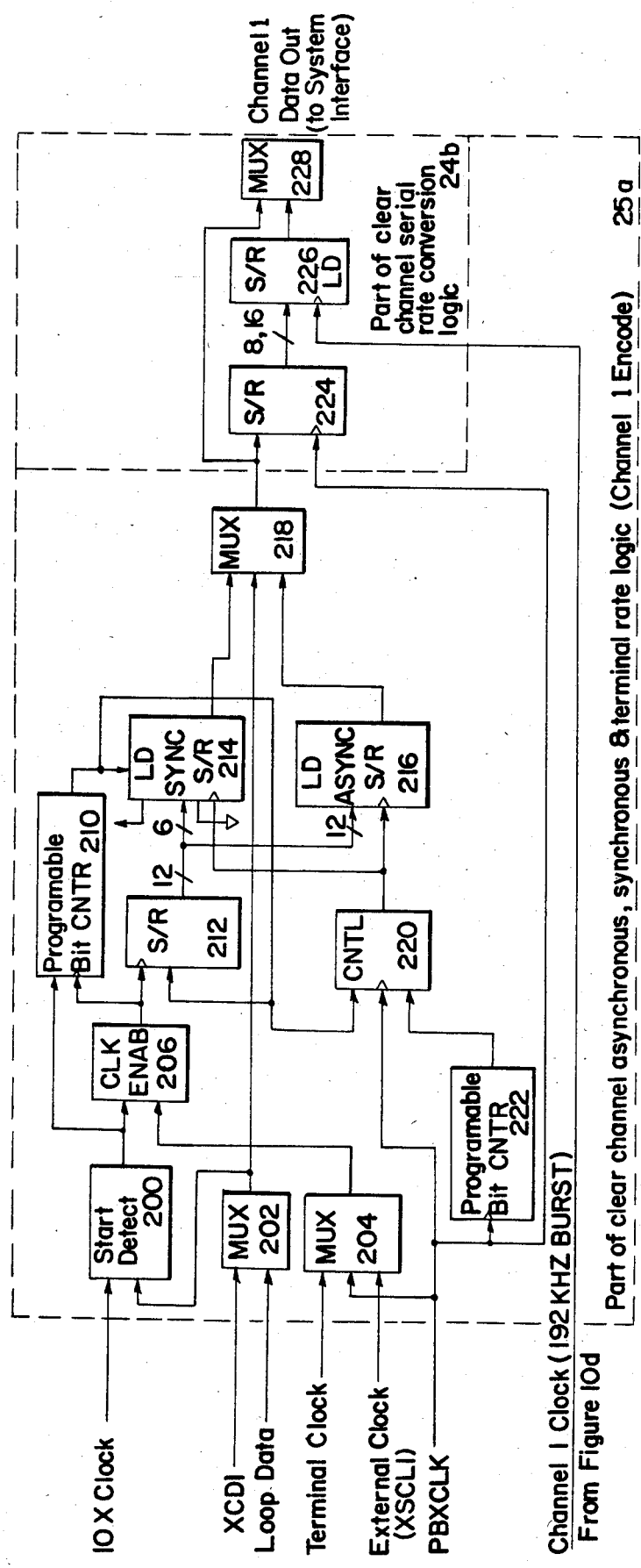
Figure 10D:
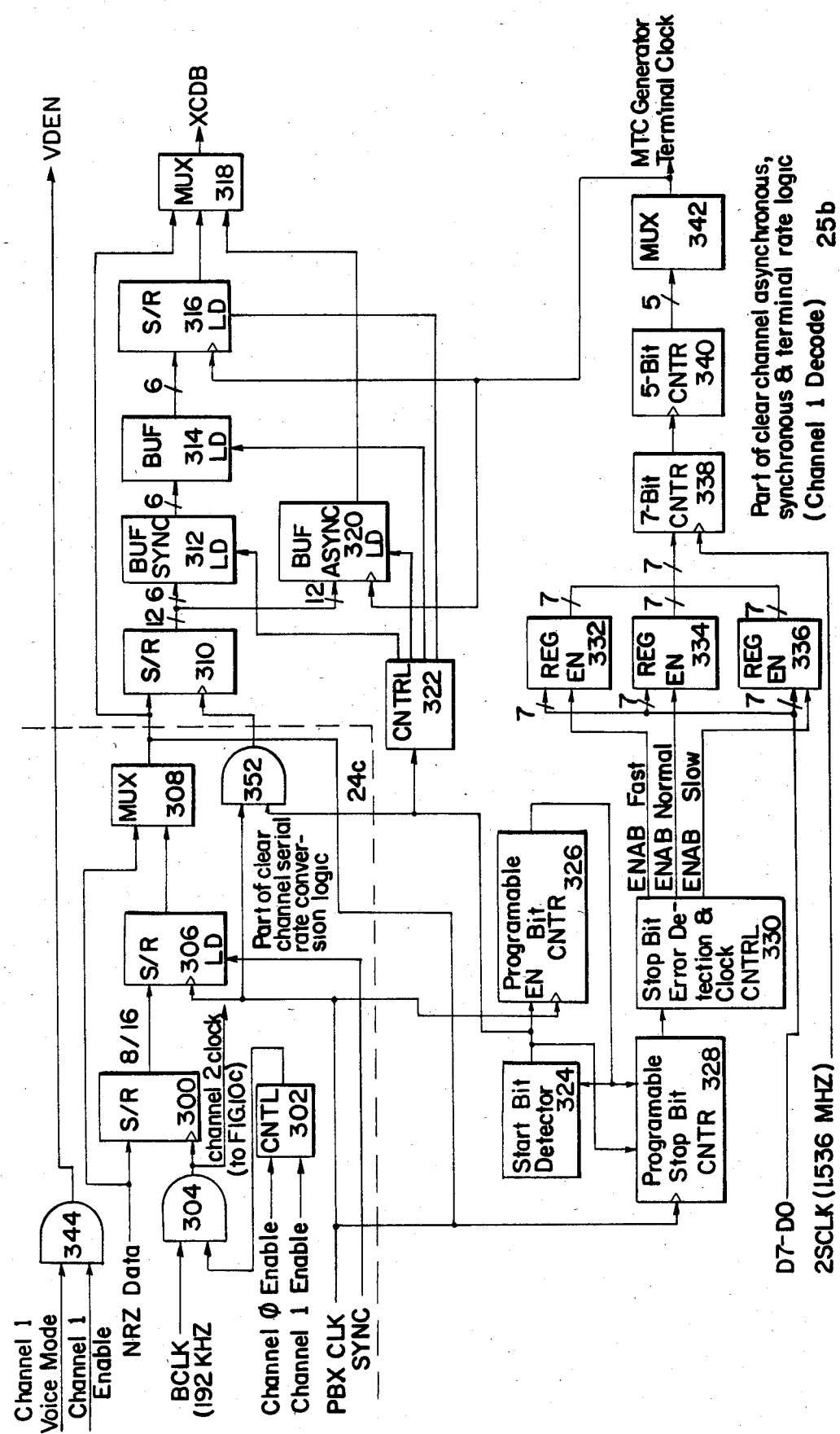

The clear channel serial rate conversion logic 24 shown in FIG. 3 is illustrated in more detail as parts of FIGS. 10(b) 10(c) and 10(d). It can convert the system clock of 768 kHz to the various clock rates required by the other logic in the MTC. FIG. 10(b) is a block diagram of the clock generation circuitry of the clear channel serial rate conversion logic 24(a). The times-two logic 142 multiplies the system clock by two to create a 1.536 MHz clock to be used by the clear channel asynchronous, synchronous and terminal rate logic 25. The terminal clock is generated by the six-bit counter 144, the multiplexer 146 and the divide-by-ten counter 148. The counter 144 generates clock rates which are ten times the terminal clock rate. The multiplexer 146 will select the appropriate rate, and the divide-by-ten counter 148 will convert the rate to the terminal clock rate. The output of multiplexer 146 is also available as a times-ten clock for the start detection logic in the asynchronous mode.

The divide-by-six counter 150, the four-bit counter 152 and multiplexer 154 generate the PBX clock. The multiplexer 154 can select the 128 kHz output of counter 150 for the 128 kHz mode. Otherwise, the multiplexer can select one of the four outputs of the four-bit counter 152 for the 64 kHz, 32 kHz, 16 kHz, or 8 kHz PBX mode.

The divide-by-five counter 156 and the seven-bit counter 158 can generate a times-eight clock for the microprocessor UART. The selectable output of 153.6 kHz, 76.8 kHz, etc. can provide the times-eight clock typically required by the microprocessor UART on line OUCLK. In addition, the 2.4 kHz output of the seven-bit counter 158 is the input to the divide-by-four counter 170 in the voice interface logic 26. Counter 170 generates the 600 Hz call waiting signal which is available on line CW.

CLEAR CHANNEL ASYNCHRONOUS, SYNCHRONOUS AND TERMINAL RATE LOGIC

FIG. 10(c) is a detailed block diagram of the channel 1 encode logic 25(a) and part of the clear channel serial rate conversion logic 24(b). The encode logic 25(a) is part of the clear channel asynchronous, synchronous and terminal rate logic 25 shown in FIG. 3. Encode logic 25(a) can receive data from the terminal device 14 and prepare it for transmission to the system node 2. In the asynchronous mode or in the terminal mode where the MTC provides the clock, the terminal clock is selected. In the synchronous mode with an external clock, XSCLI, the external clock is selected. In the PBX mode, the internal PBX clock is selected. Multiplexer 202 selects either the input data from line XCDI in non-loopback modes, or from the NRZ output in the loopback mode. The start detector 200 can be used in the asynchronous mode to detect the occurrence of the start bit in the asynchronous data. Start detector 200 can utilize the 10X clock to sample the incoming data until the start bit is detected. The output of the start detector enables the selected clock through the clock enable circuitry 206. The selected data from multiplexer 202 is shifted into shift register 212 utilizing the clock generated by the clock enable circuitry 206. The programmable bit counter 210 can function to determine when a full character of data has been received and can load the data into the synchronous shift register 214 and the asynchronous shift register 216.

As described above, six bits of data per character are typically transmitted by the terminal device 14 in the synchronous mode. Therefore, shift register 214 is typically loaded with the six bits of data and the start bit and the first stop bit. In the asynchronous mode, the entire character of data typically will be transmitted to the system node 2. Therefore, up to twelve bits of data can be loaded into the shift register 216 from shift register 212.

In the terminal mode, control logic 220 can receive inputs from programmable bit counter 222 and programmable bit counter 210 to determine when the data in synchronous shift register 214 and asynchronous shift register 216 should be clocked out at the PBX data rates. Multiplexer 218 can select either the asynchronous data from shift register 216, the synchronous data from shift register 214, or the direct data input from multiplexer 202. The direct data input is selected in the PBX mode or in the second voice channel mode. The data from multiplexer 218 can be shifted into shift register 224, which is part of the clear channel serial rate conversion logic 24(b) also shown in FIG. 10(b), at the PBX data rate. If the data received is an additional channel of voice data, the output of multiplexer 218 is a direct input to multiplexer 228 to be shifted out during the channel one enable time at the system data rate. Shift register 226 can be loaded with the output of shift register 224 and can be shifted out serially at the 192 kHz data rate. The data shifted into shift register 224 and shifted out of shift register 226 is typically eight bits length. In the 128 kHz PBX mode, sixteen bits of data may be shifted into shift register 224 and out of shift register 226 during the channel 0 and channel 1 enable times. In the 128 kHz PBX mode, the channel 0 voice interface logic is typically disabled.

As illustrated in FIG. 7, the number of bits transmitted and received by the MTC in the preferred embodiment in each 125-microsecond frame is constant, i.e. 24 bits; however, the MTC accommodates the different data rates by varying the number of valid data bits transmitted or received during each frame. For example, in the 64 kHz PBX mode, the eight bits labelled CD7–CD0 are valid data bits. (Eight bits per frame times 8,000 frames per second equals 64,000 bits per second.) To accommodate the 128 kHz PBX data rate, the MTC must disable the voice channel and use the eight bits of voice channel data, V7–V0, as additional clear channel data bits. Conversely, if less than a 64 kHz data rate is required, the MTC does not utilize all eight bits in the clear channel portion of the message frame. For instance, in the 32 kHz PBX mode, the MTC will transmit and receive valid data with bits CD3–CD0, and bits CD7–CD4 wil be undefined. Although bits CD7–CD4 will be transmitted, the system mode will be programmed to ignore them, just as the MTC will ignore bits CD7–CD4 when received. Since the system node will ignore the bits, they will not occupy part of a system time slot.

FIG. 10(d) is a detailed block diagram of the channel 1 decode logic 25(b) which forms part of the clear channel asynchronous, synchronous and terminal rate logic 25, and is also a detailed block diagram of the clear channel serial rate conversion rate 24(c), both generally shown in FIG. 3. In the normal mode of operation NRZ data and the 192 kHz system block can be received from the system interface 21 by shift register 300 in the clear channel serial rate conversion logic 24. In the second voice channel mode, the NRZ data can be gated through multiplexer 308 and multiplexer 318 directly to the output where it is shifted out during the channel 1 enable time. Circuits within the clear channel serial rate conversion logic, represented by AND-gate 344, can generate the voice data enable signal (VDEN) which gates the data out during the channel one enable time. In all other modes, the NRZ data from system interface 21 can be shifted into shift register 300 by the 192 kHz system clock during the channel 1 portion of the message frame. The output of control logic 302 enables the 192 kHz clock for eight (normal mode) or sixteen (128 kHz mode) clock periods through the logic represented by AND-gate 304. Responsive to the output of AND-gate 304, shift register 300 receives eight bits of data, in the normal mode, or sixteen bits of data in the 128 kHz PBX data mode. Shift register 306 can be loaded once per frame with the output of shift register 300. The data shift out of shift register 306 at the PBX clock rate is input to multiplexer 308.

In the PBX modes, multiplexer 318 of the clear channel asynchronous, synchronous and terminal rate logic 25(b) can select the output of multiplexer 308 for direct output to the terminal device. In the synchronous or asynchronous terminal modes, the output of multiplexer 308 can be shifted into shift register 310 of the clear channel asynchronous, synchronous and terminal rate logic 25(b) at the PBX clock rate. The number of clock edges required to gate shift register 310 can be determined by the start bit detector logic 324. That logic searches for the occurrence of the first start bit and can shift data into shift register 310 until the occurrence of the next stop bit. In the asynchronous mode multiplexer 318 selects the output from asynchronous buffer 320 for terminal communication to the terminal devices. In the synchronous mode, multiplexer 318 selects the output of shift register 316. In either the synchronous or asynchronous terminal modes, the output rates may be monitored and controlled as described below.

The output of the programmable bit counter 326 can also control the programmable stop bit counter 328. Counter 328 can count the number of stop bits from the last data bit until the occurrence of the next start bit as indicated by detector 324. The output of the stop bit counter 328 is input to the stop bit error detection and clock control circuit 330. If three stop bits are detected, the enable nominal clock rate signal typically enables the output of register 334 to the seven-bit tri-state bus which is input to the seven-bit counter 338. If less than three bits are detected, the enable fast clock output of clock control circuit 330 can enable the seven-bit output of register 332 to the tri-state bus. If more than three stop bits are detected, the enable slow output of clock control logic 330 can enable the seven-bit output of register 336 to the tri-state bus. The tri-state registers 332, 334 and 336, are loaded with a seven-bit value which represents a value by which the 1.536 MHz clock is to be divided to generate the terminal clock frequency as previously described. The registers can be loaded with the contents of the least significant seven bits on the data lines (D6-D0) by a write command from the microprocessor 12. In the preferred embodiment, the fast frequency register is typically loaded with a value of 39; the nominal rate register is typically loaded with a value of 40; and the slow rate register is typically loaded with a value of 41. At the end of each terminal character output, the seven-bit counter 338 is loaded with the seven-bit value from the selected tri-state register. The 1.536 MHz clock is then divided by that value to result in a frequency of 39,230 Hz for the fast clock, 38,400 Hz for the nominal clock and 37,951 Hz for the slow clock. The clock control logic 330 can enable the fast or slow register output for the duration of 24 terminal bit periods. At that time, the nominal clock rate register will be re-enable until the occurrence of the next extra or missing stop bit. The output of the seven-bit counter is counted down by the five-digit counter 340 to achieve the requisite clock rates for the terminal clock. In the present embodiment, multiplexer 342 can select one of the five clock rates from 5-bit counter 340. If the nominal clock is selected, the output of multiplexer 342 can be 19.2 kHz, 9.6 kHz, 4.8 kHz, 2.4 kHz, or 1.2 kHz. The particular clock rate employed is selected in response to the requirements of clear channel device 14.

The terminal clock output of multiplexer 342 can clock the asynchronous shift register 320 and the synchronous shift register 316 and can also be sent to the terminal device on XCLKO 66. In the asynchronous mode, the terminal clock is typically the nominal clock frequency, and the output of the asynchronous shift register 320 can be gated through multiplexer 318 to the terminal device on XCDO. In the synchronous mode, the output of the synchronous buffer 312 can be gated through buffer 314 and through shift register 316 before it is shifted out through multiplexer 318 by the MTC teminal clock. As previously described, the terminal clock may be affected by the selection of the fast or slow clock rates. The gating of data from buffer register 312 through buffer 314 into shift register 316 is controlled by control logic 322 to assure that the data is synchronized in the transition from the PBX clock rate of shift register 310 to the MTC terminal clock rate of shift register 316.

FIG. 10(d), also illustrates how the MTC accommodates the varying data rates. Shift register 300 receives eight bits of data per frame (sixteen bits per frame in 128 kHz PBX mode) which are shifted in at the 192 kHz system clock rate. At the end of each frame, the data in shift register 300 is parallel loaded into shift register 306. Although at least eight bits of data are loaded into shift register 306 in any of the modes, only the valid data will be serially shifted out of shift register 306. For instance, at the 32 kHz data rate, shift register 306 will only receive four clock edges in the interval from the time it is loaded at the end of one frame until it is loaded again at the end of the next frame. Thus, the invalid data bits do not get shifted out of shift register 306 to be propagated through the MTC.

In the synchronous terminal mode, synchronous buffer 312 strips the start bits and stop bits from the incoming data stream by only loading the six bits of data following the start bit which have been shifted into shift register 310. Thus, only six of the ten bits were shifted into shift register 310 at 32 kHz will be shifted out of shift register 316 at 19.2 kHz.

MICROPROCESSOR INTERFACE

Figure 10E:
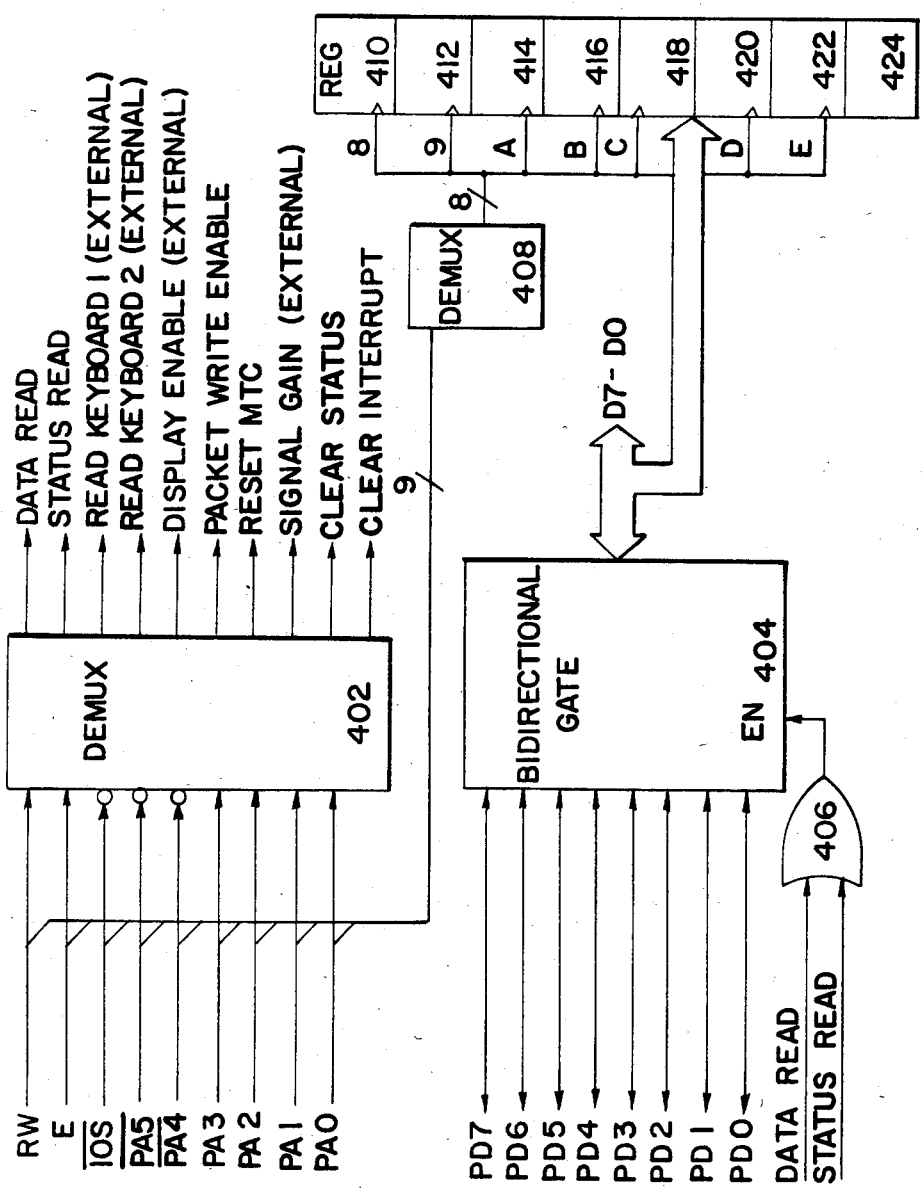

The microprocessor interface 23 is shown in FIG. 10(e). Referencing FIG. 3, the microprocessor interface 23 can receive parallel data from and send parallel data to the TELSET microprocessor 12. The microprocessor interface 23 can decode the address lines PA5, PA4 and from the microprocessor 12 to determine whether it is being accessed by the microprocessor 12. The microprocessor interface 23 can decode the least significant four address lines (PA3-PA0) from the microprocessor 12 to determine the function to be performed. The two most significant address lines (PA5 and PA4) typically must both be reset (0) to indicate that the MTC 11 is being accessed by the microprocessor 12. If either or both are set, the MTC does not respond to any of the microprocessor commands. The demultiplexer logic 402 can decode the microprocessor addresses, PA5, PA4, PA3-PA0, the enable line, E, the input/output select line, IOS/ and the read/write select line, RW to determine the operation to be performed by the MTC 11.

The read/write input, RW, informs the MTC which direction data is being transmitted. If RW is a logic one (read), the microprocessor 12 typically is initiating a read cycle which indicates that the MTC 11 or another device (i.e., keyboards 15 or 16, or display 17) should output data on the data bus. If RW is a logic zero (write), the microprocessor 12 will typically be driving the data bus to provide information to the MTC 11 or to another device. Data between the MTC 11 and the microprocessor 12 can be transmitted and received on the eight bidirectional data lines, PD7-PD0. The enable input, E, determines when the data lines are active during a read or write. The input/output select IOS/ is an additional input which can determine when the MTC should respond. When it is low, the MTC 11 can respond to microprocessor commands.

The operations typically performed by the MTC 11 in response to commands from the microprocessor 12 are summarized in the following exemplary MTC Control Register Definition Table. The addresses shown in hexadecimal format are those addresses decoded from PA3, PA2, PA1 and PA0. The bit assignments refer to PD7-PD0.

MTC CONTROL REGISTER DEFINITIONS

The following table defines each control register bit within the MTC. Descriptions are from the standpoint of a microprocessor accessing the MTC's parallel port, so the symbol IN: refers to data read by the microprocessor from th MTC, and OUT: refers to data written into the MTC.

| ADDRS | BIT | | DESCRIPTION |
|---|---|---|---|
| 00 | 7-0 | IN: | SIGNALING DATA |
|  | 7-0 | OUT: | SIGNALING DATA |
| 01 | 0 | IN: | SIGNALING DATA IN READY WHEN LOW |
|  | 1 | | SIGNALING DATA OUT BUSY WHEN LOW |
|  | 2 | | SIGNALING DATA IN OVERFLOW WHEN LOW |
|  | 3 | | SIGNALING DATA IN CRC ERROR WHEN LOW |
|  | 4 | | SIGNALING DATA IN END MESSAGE WHEN LOW |
|  | 5 | | SIGNALING DATA IN UNDERFLOW WHEN LOW |
|  | 7-6 | | NOT USED |
|  | XX | OUT: | RESET MTC (Does not affect control registers) |
| 02 | 7-0 | IN: | READ KEYBOARD MATRIX #1 |
|  | 7-0 | OUT: | SIGNAL GAIN AND CALL WAITING CONTROL |
| 03 | 7-0 | IN: | READ KEYBOARD MATRIX #2 |
|  | XX | OUT: | NOT USED |
| 04 | 7-0 | IN: | DISPLAY READ INTERNAL RAM ADDRESS POINTER (DD & CG) |
|  | 7-0 | OUT: | DISPLAY COMMAND WRITE |
| 05 | 7-0 | IN: | READS DATA FROM DISPLAY (DD/CG) |
|  |  | OUT: | WRITES DATA TO DISPLAY |
| 06 | 7-0 | IN: | NOT USED |
|  | XX | OUT: | CLEAR STATUS WORD |
| 07 | 7-0 | IN: | NOT USED |
|  | XX | OUT: | CLEAR INTERRUPT FROM MTC |
| 08 | 7-0 | IN: | NOT USED |
|  | 0 | OUT: | MODEM MODE WHEN LOW; TERMINAL MODE WHEN HIGH |
|  | 1 | | ASYNCHRONOUS MODE WHEN LOW; SYNC WHEN HIGH |
|  | 2 | | LOOP CHANNEL 0 WHEN HIGH |
|  | 3 | | LOOP CHANNEL 1 WHEN HIGH |
|  | 4 | | PBX RATE WHEN LOW; TERMINAL RATE WHEN HIGH |
|  | 7-5 | | RATE SELECTION: |

|  | ASYNC | PBX | SYNC |
|---|---|---|---|
| 000 | NONE | 128K | NONE |
| 001 | NONE | 64K | NONE |
| 010 | 19.2K | 32K | 19.2K |
| 011 | 9.6K | 16K | 9.6K |
| 100 | 4.8K | 8K | 4.8K |
| 101 | 2.4K | 8K | 2.4K |
|  |  |  | 1.2K |
| 11x | NONE | NONE | NONE |

| ADDRS | BIT | | DESCRIPTION | |
|---|---|---|---|---|
| 09 | 7-0 | IN: | NOT USED | |
|  | 0 | OUT: | NOT USED | |
|  | 3-1 | | BITS PER MESSAGE-CXC SIDE | |
|  |  | | 000 | 12 |
|  |  | | 001 | 11 |
|  |  | | 010 | 10 |
|  |  | | 011 | 9 |
|  |  | | 100 | 8 |
|  |  | | 101 | 7 |
|  |  | | 110 | 6 |
|  |  | | 111 | NOT USED |
|  | 5-4 | | NOT USED | |
|  | 6 | | 128K MODE WHEN HIGH (USES BOTH CHANNELS) | |
|  | 7 | | CHANNEL 1 IN VOICE MODE WHEN HIGH | |
| 0A | 7-0 | IN: | NOT USED | |
|  | 0 | OUT: | NOT USED | |
|  | 3-1 | | BITS PER MESSAGE-TERMINAL SIDE (SEE 109, BITS 3-1) | |
|  | 5-4 | | NOT USED | |
|  | 7-6 | | BITS PER FRAME: | |
|  |  | | 00 | 1 |

-continued

| ADDRS | BIT | | DESCRIPTION | | |
|---|---|---|---|---|---|
| | | | | 01 | 2 |
| | | | | 10 | 4 |
| | | | | 11 | 8 |
| 0B | 7-0 | IN: | NOT USED | | |
| | 2-0 | OUT: | MICROPROCESSOR UART CLOCK | | |
| | | | | 000 | 19.2K BAUD |
| | | | | 001 | 9.6K |
| | | | | 010 | 4.8K |
| | | | | 011 | 2.4K |
| | | | | 100 | 1.2K |
| | | | | 101 | .6K |
| | | | | 110 | .3K |
| | | | | 111 | .15K |
| | 3 | | UART CLOCK ENABLE WHEN HIGH | | |
| | 4 | | NOT USED | | |
| | 5 | | PWDN OUTPUT HIGH WHEN HIGH | | |
| | 6 | | NOT USED | | |
| | 7 | | NOT USED | | |
| 0C | 7-0 | IN: | NOT USED | | |
| | 6-0 | OUT: | FAST CLOCK VALUE FOR SYNC TERMINAL MODE | | |
| | | | 19.2K – 4.8 | | 27 |
| | | | 2.4K – 1.2K | | 4F |
| | 7 | | NOT USED | | |
| 0D | 7-0 | IN: | NOT USED | | |
| | 6-0 | OUT: | NOMINAL CLOCK VALUE FOR SYNC TERMINAL MODE | | |
| | | | 19.2K – 4.8 | | 28 |
| | | | 2.4K – 1.2K | | 50 |
| | 7 | | NOT USED | | |
| 0E | 7-0 | IN: | NOT USED | | |
| | 6-0 | OUT: | SLOW CLOCK VALUE FOR SYNC TERMINAL MODE | | |
| | | | 19.2K – 4.8 | | 29 |
| | | | 2.4K – 1.2K | | 51 |
| | 7 | | NOT USED | | |
| 0F | 7-0 | IN: | NOT USED | | |
| | 4-0 | OUT: | STOP BIT COUNTER PRESET VALUE | | |
| | | | 19.2K – 2.4K | | 1E |
| | | | 1.2K | | 14 |
| | 7-5 | | NOT USED | | |

**NOTE
The last three registers (10C, 10D, 10E) contain counter pre-load values for varying the outbound clock that the MTC provides for synchronous terminals that operate at other than power-of-2 frequencies.

The data read (address 00) can cause the eight bits of data from the packet channel input logic 22 to be gated through the bidirectional gate 404 to the microprocessor data bus (D7-D0). The status read (address 01) can cause the status bits from the packet channel interface logic 22 to be gated through the bidirectional gate 404. The format of the status bits transmitted to the microprocessor 12 is shown in the MTC Control Register Definition Table appended to the specification. The packet enable line, activated by a write to address 00, goes to the packet channel logic 22 to cause eight bits of data to be gated through the bidirectional gate 404 to the packet channel shift register 126 in FIG. 10(a). The reset MTC line, activated by a write to address 01, causes certain initial conditions of the MTC to be set. The clear status line, activated by a write to address 06, clears the status register in the packet channel logic. The clear interrupt line, activated by a write to address 07, clears the packet channel logic interrupt.

If the microprocessor 12 performs a read command on address 02, the MTC 11 generates an enable signal to a keyboard matrix 14 which typically causes that keyboard matrix to enable its data output to the eight bidirectional data lines. When this occurs, the MTC 11 typically does not drive the data lines. Similarly, a microprocessor read command on address 03 will cause an enable signal to go to the other keyboard matrix 15. In the same fashion, addresses 04 and 05 are used by the microprocessor 12 to read from or write to the display 16. The MTC 11 participates in the access by generating enable signals to the display 16 when either address is decoded. Typically, the MTC 11 neither drives the data lines nor inputs the data for these two addresses.

If a microprocessor write command is performed on address 02, the MTC 11 activates the gain signal SGN/, to the TELSET 1. This informs the speaker phone or another device in the TELSET that the data bus contains control information for the speaker phone or the handset speaker. This data is typically used by the speaker phone or some other device to control the gain and also to enable the call waiting signal CW. In conjunction with this use, the MTC can also generate a constant 600 Hz signal on CW which can be gated to the handset speaker or to the internal speaker to generate the call waiting signal tone. An exemplary speakerphone suitable for use in the conjunction with the present invention is described in co-pending U.S. patent application Ser. No. 501,388 for QUASI FULL-DUPLEX SPEAKERPHONE, filed on June 6, 1983, assigned to the common assignee. The teachings of that application are incorporated by reference herein.

A write on command address 0B with bit five set will generate the power down (PWDN) signal which can be used by a CODEC 13 or other device in turn its power off when not in use.

Figure 12:
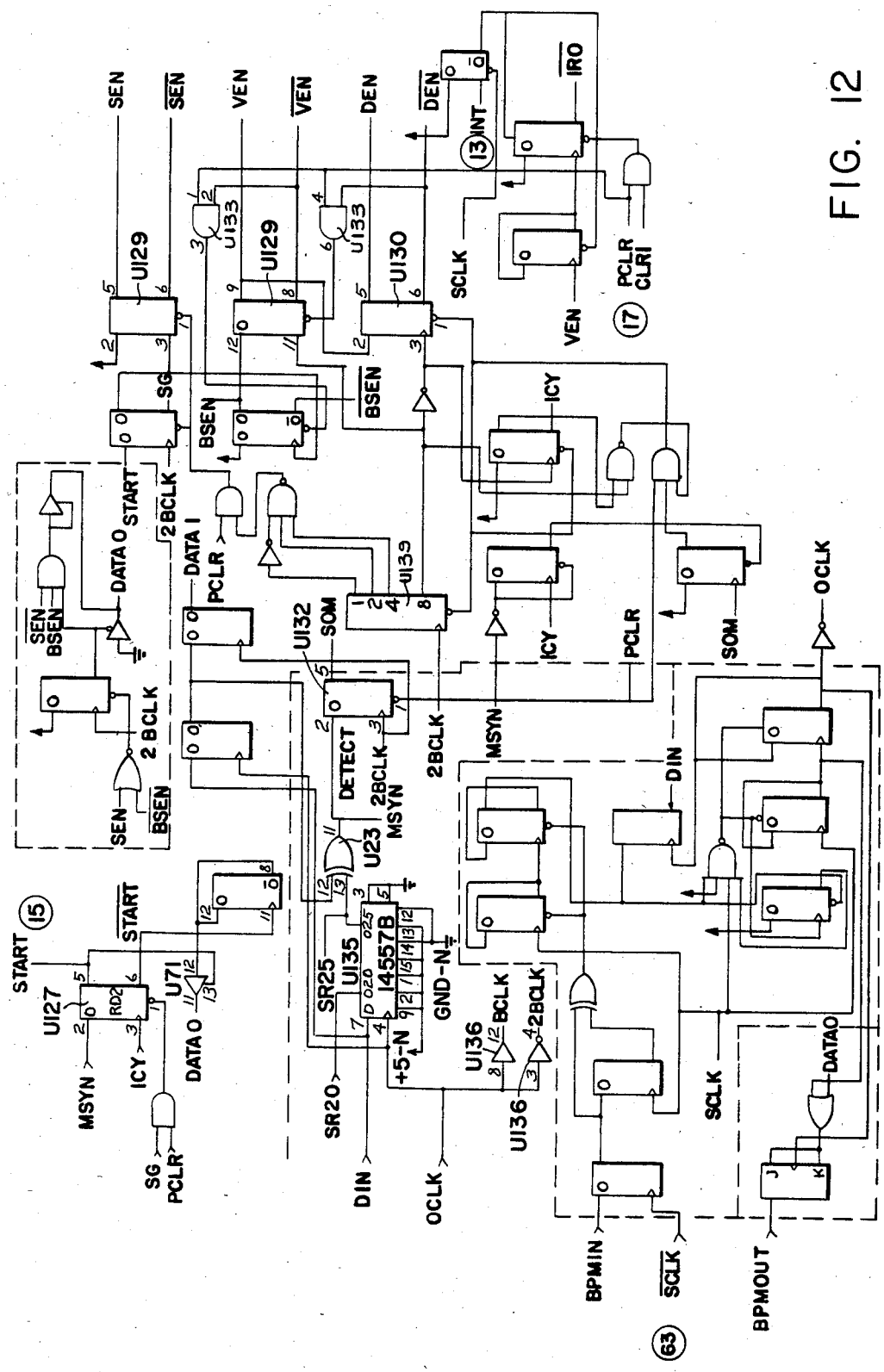
FIGS. 12–23 are detailed logic diagrams representing individual logic elements that may be included in the modules described and illustrated in connection with the previous drawings.
Figure 13:
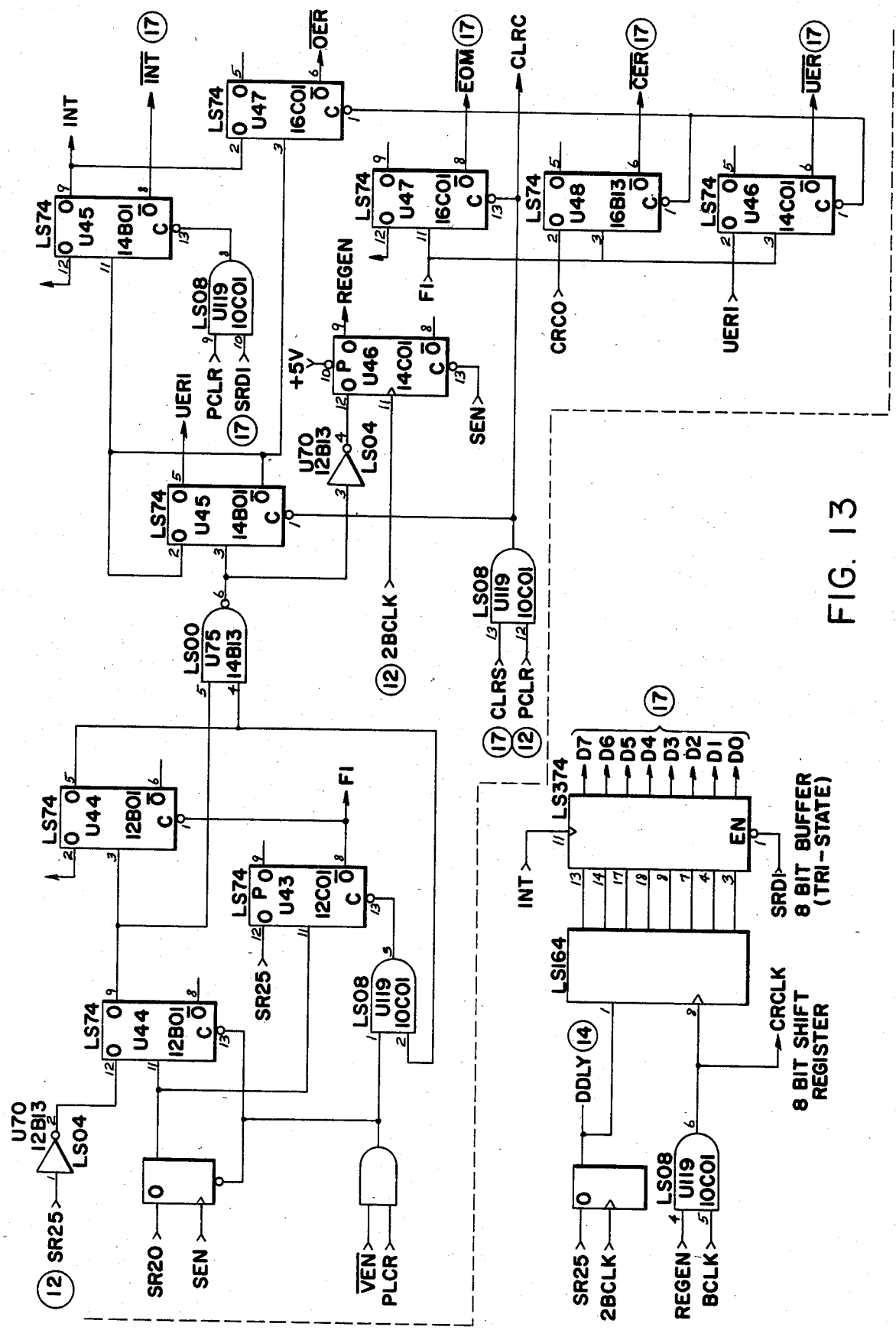
Figure 14:
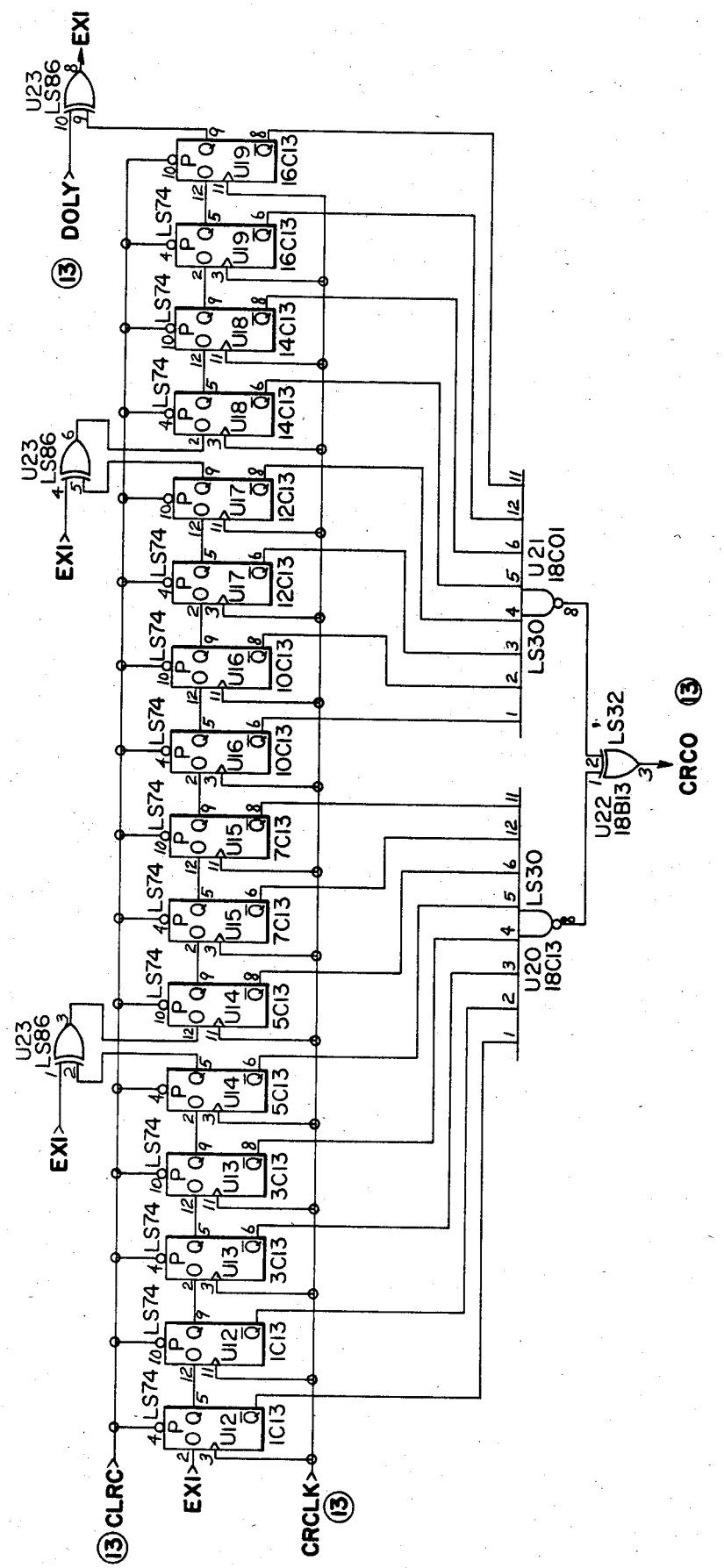
Figure 15:
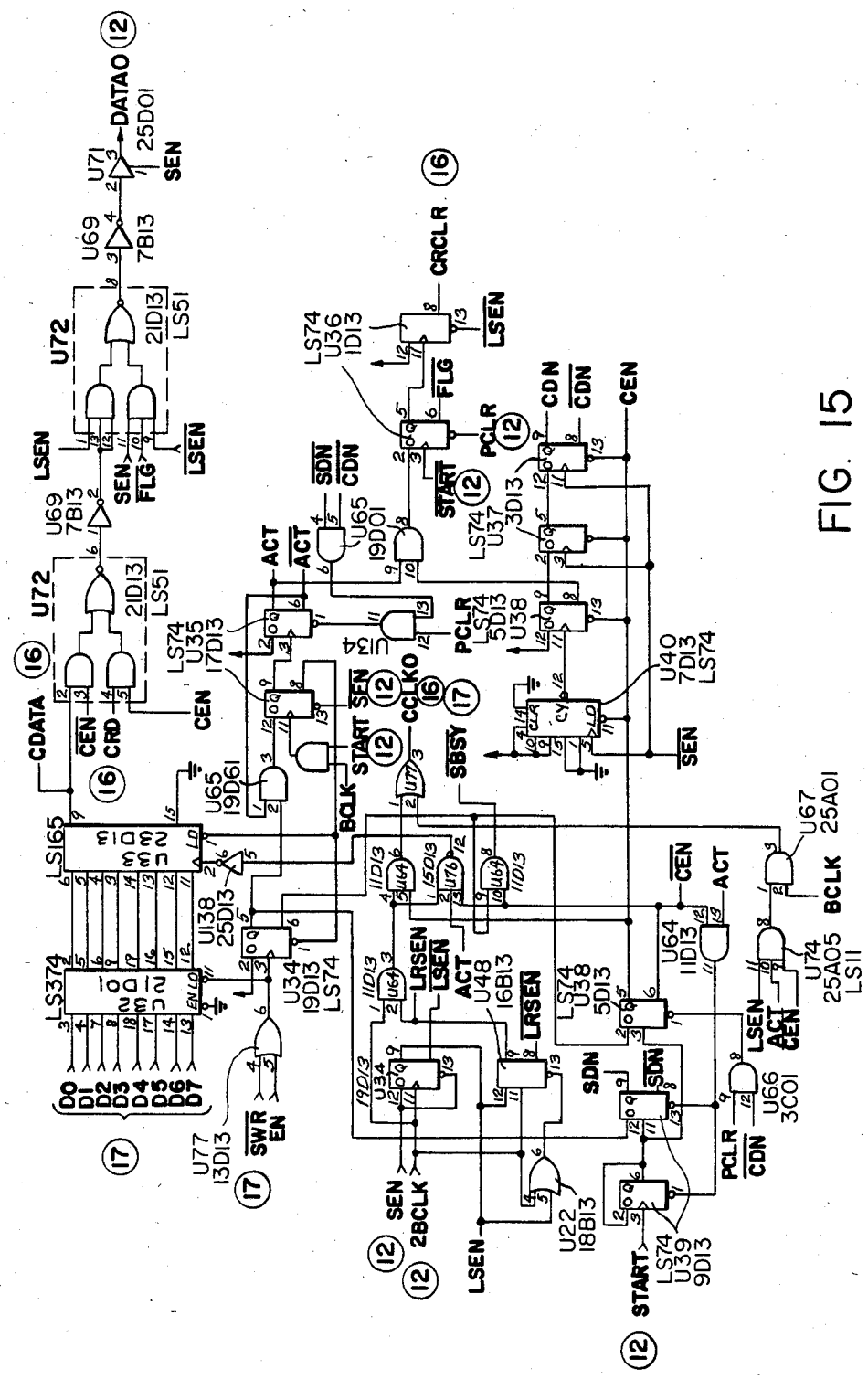
Figure 16:
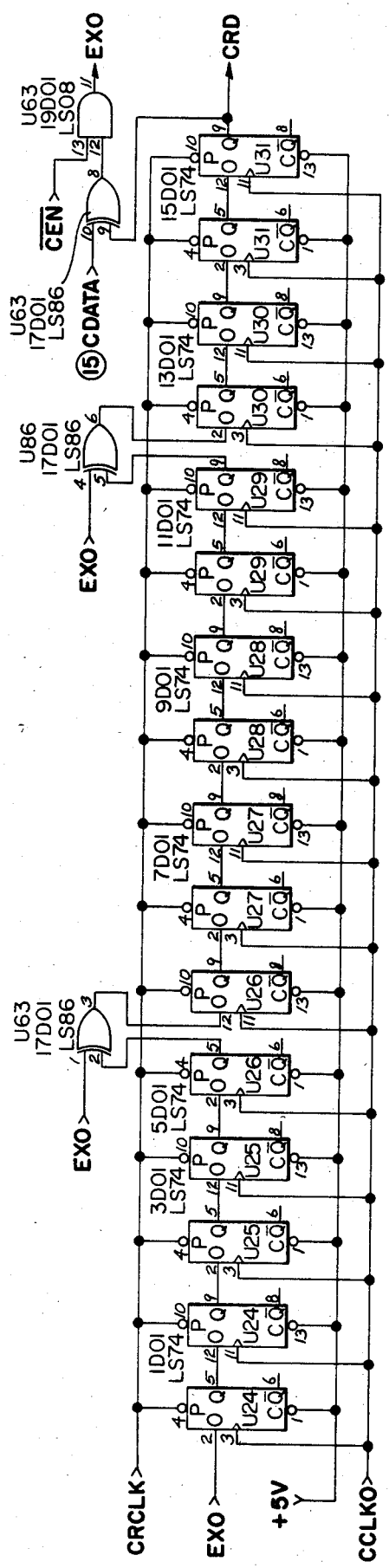
Figure 17:
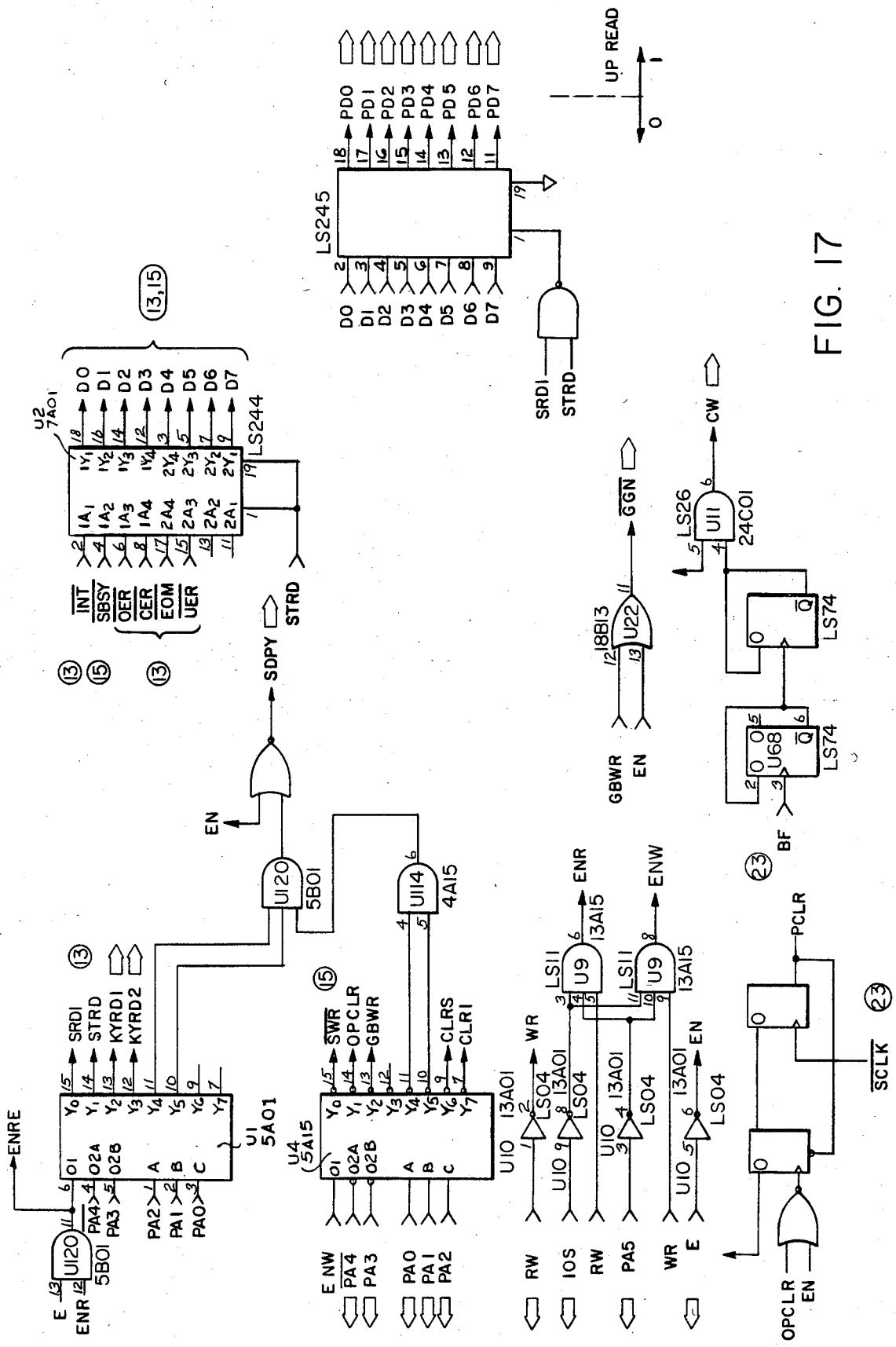
Figure 18:
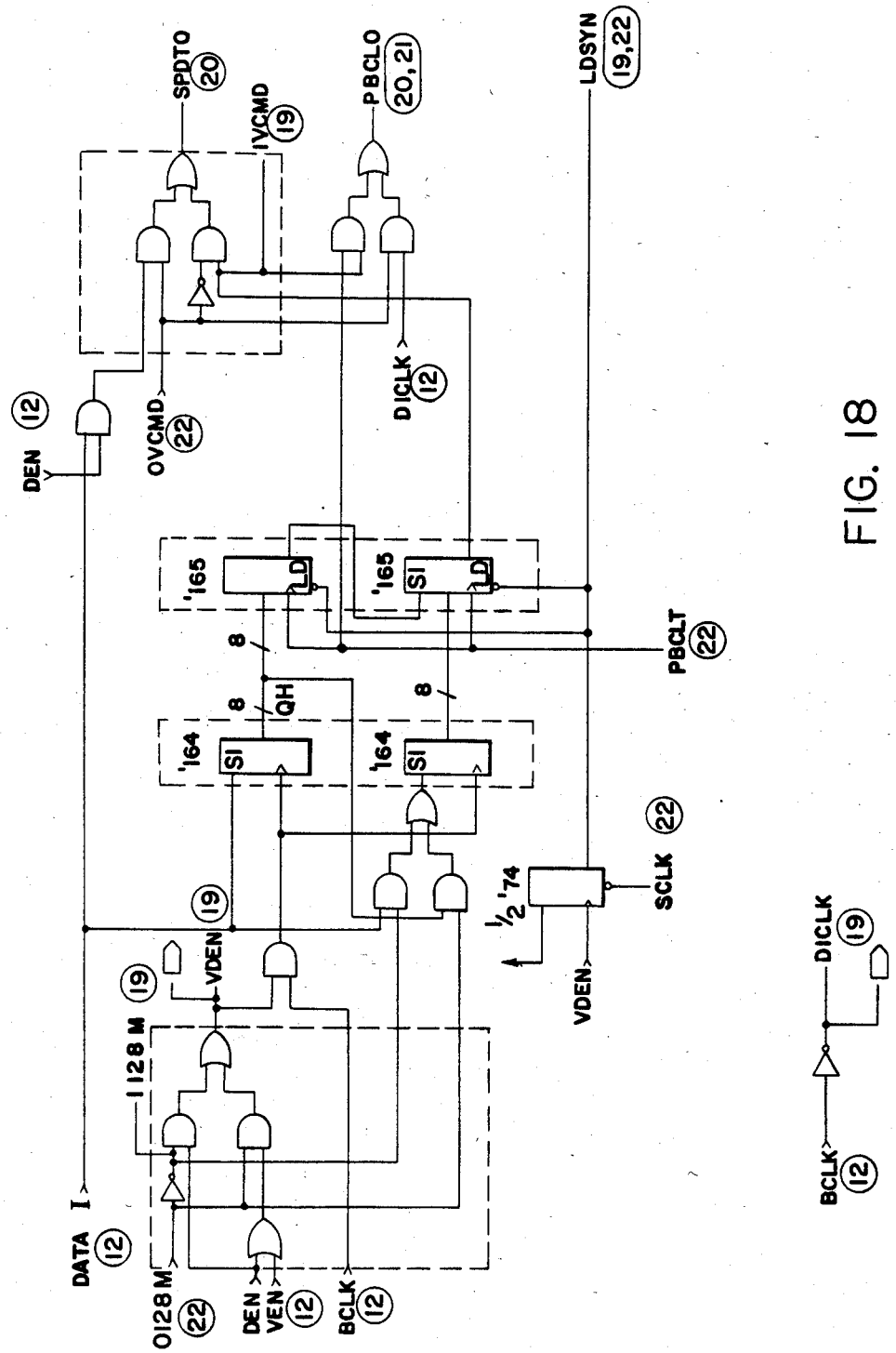
Figure 19:
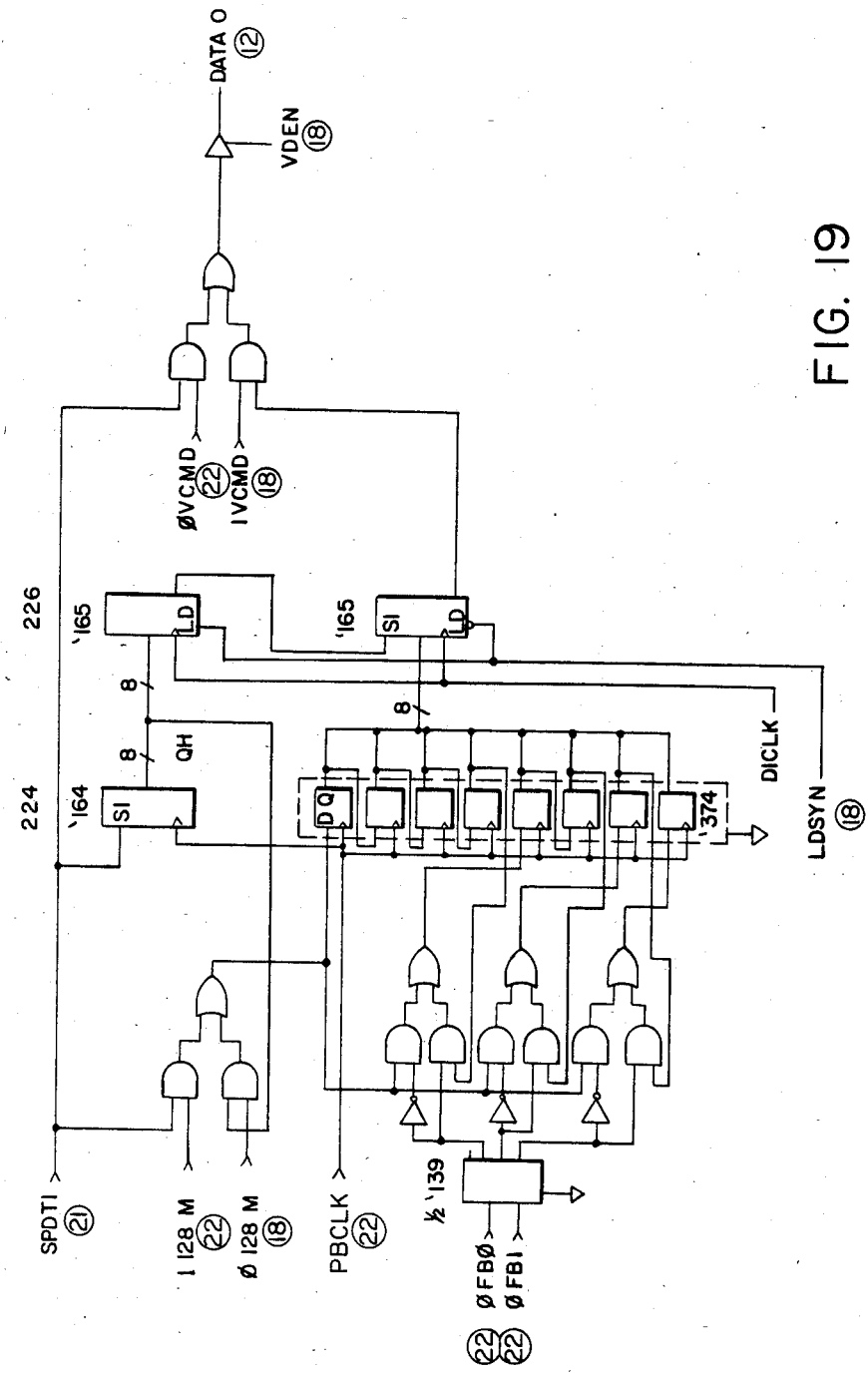
Figure 20:
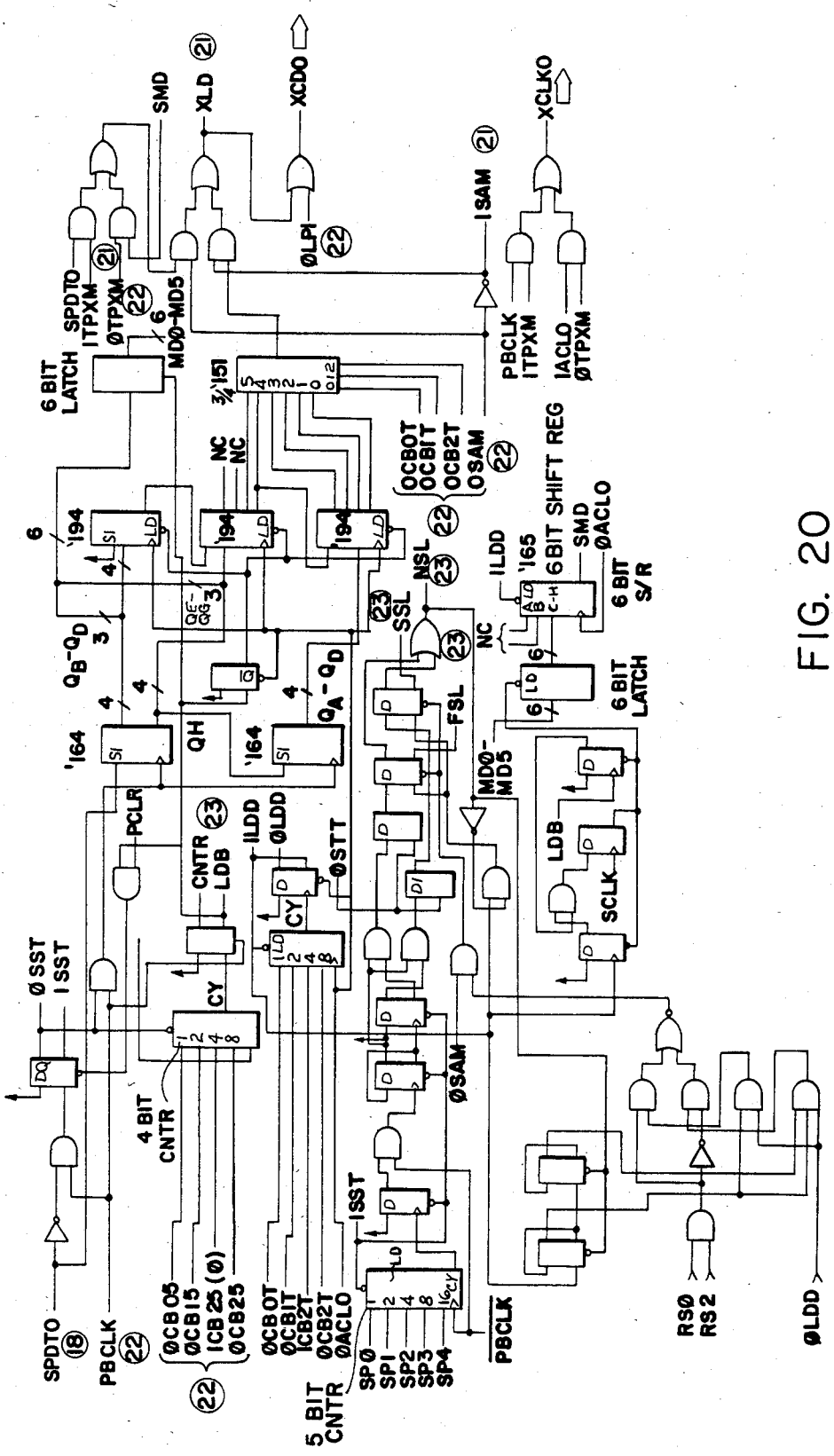
Figure 21:
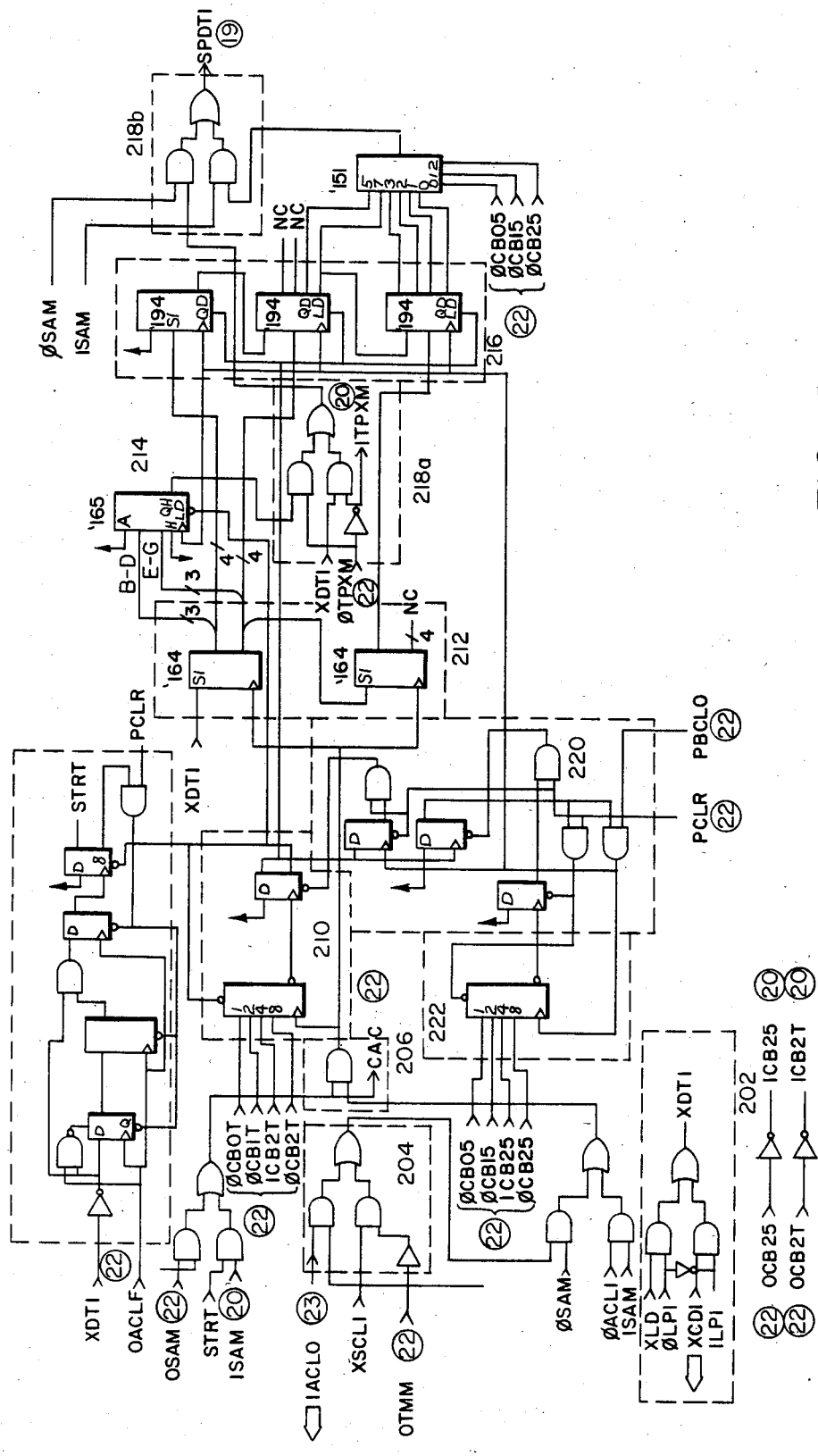
Figure 22:
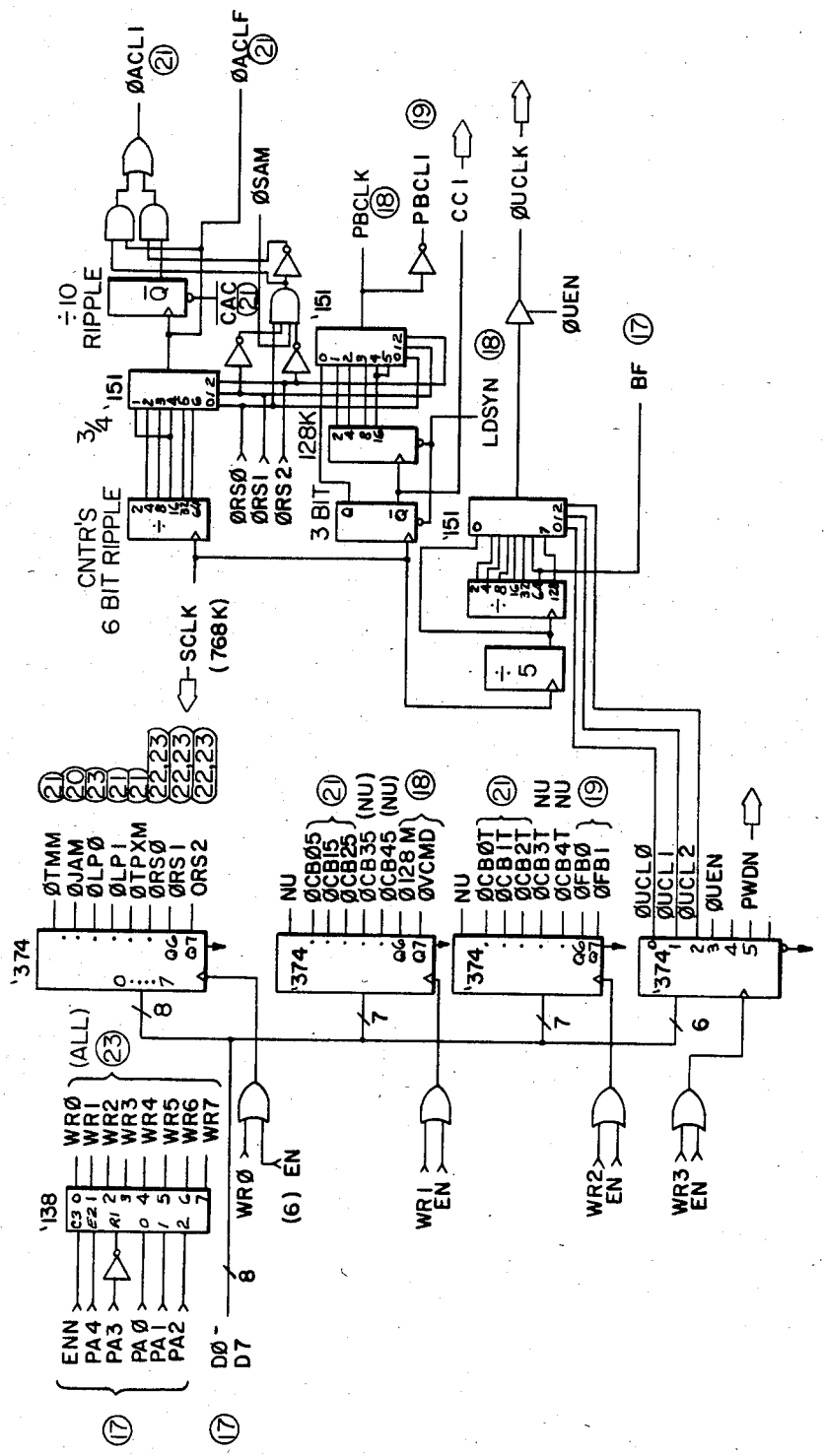
Figure 23:
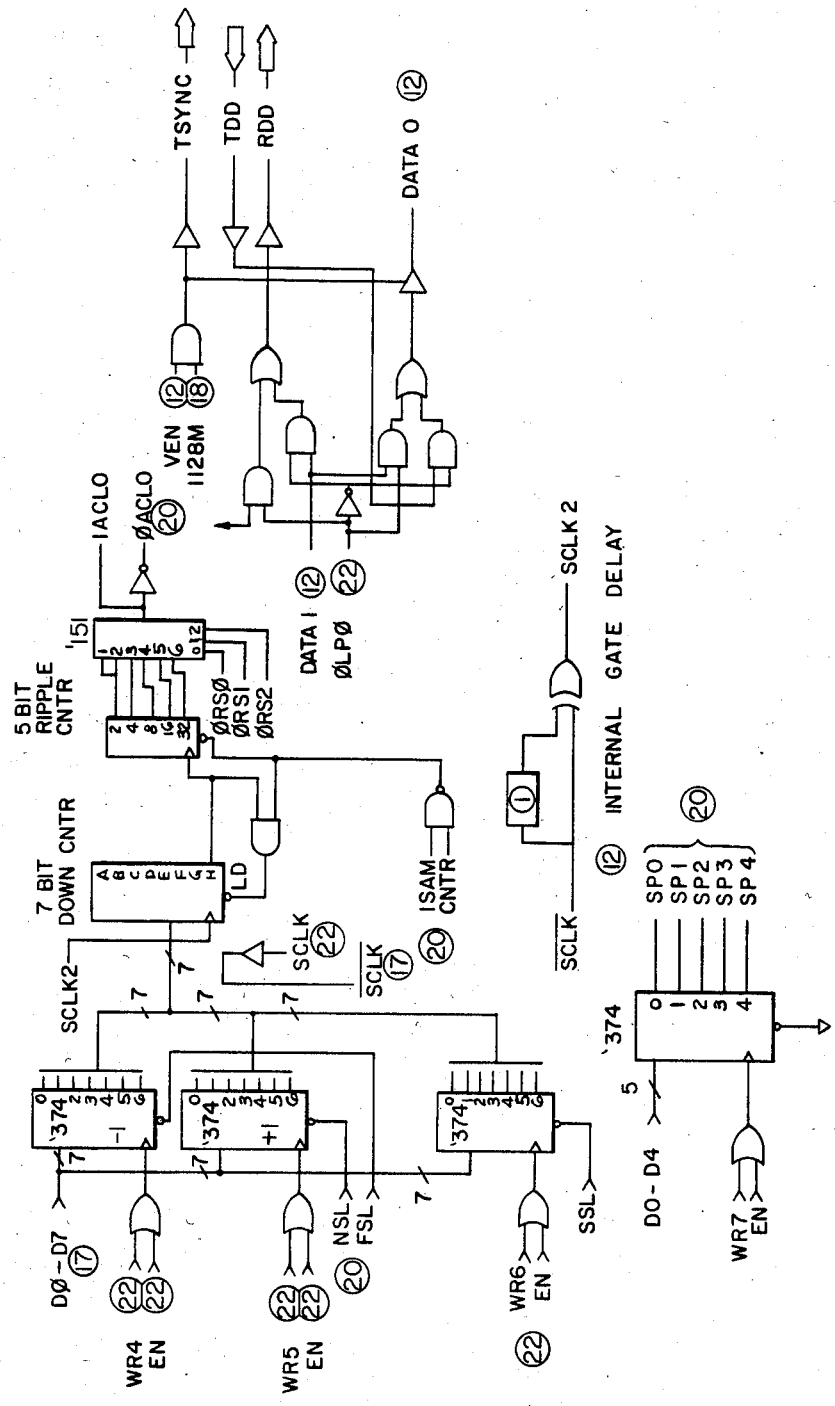

The multiplexer 408 generates enables which cause the eight bits of data from the microprocessor to be gated through bidirectional gate 404 into registers 410, 412, 414, 416, 418, 420, 422 and 424. These eight registers hold the status bits described in the MTC Control Register Definition Table (FIG. 12) and are activated by write commands to addresses 08, 09, 0A, 0B, 0C, 0D, 0E, and 0F respectively.

The bidirectional gate 404 is a tri-state gate in each direction and does not affect the microprocessor data bus (PD7-PD0) except when a status read or a data read activates the enable line to the bidirectional gate 404 through OR-gate 406.

DETAILED LOGIC DIAGRAMS

FIGS. 12 through 23 are detailed logic diagrams representing individual logic elements that may be included in the modules described and illustrated in connection with the previous drawings.

As one of ordinary skill in the art will readily recognize, the structure and functions described in connection with the previous drawings may be implemented by various alternative arrangements of the logic elements. Although such equivalent detailed implementations may be used, as a matter of design choice, the particular arrangement of very basic elements is set forth in FIGS. 12 through 23 in the interest of total disclosure of the present invention.

The foregoing description of the MTC represents the present embodiment of the invention. The data rates and the message lengths described above are exemplary of the present embodiment, but do not represent limitations on the invention. The message lengths, data rates and other design criteria can be changed without going beyond the scope of the invention, which is defined only by the claim appended below.

What is claimed is:

1. A switching device for transferring digital information between a system node which functions at a first rate and one or more devices which function at rates which are different than said first rate, the switching device comprising:
   a system interface for communicating a signal stream including voice, data, and control information between the switching device and the system node and for providing signals identifying said voice, data, and control information in the switching device, the system interface including a system interface multiplexer operative to combine voice signals from an audio device and data signals from a data device in a message frame for transmission to the system node;
   a microprocessor interface responsive to said identifying signals for communicating control information between a selected device and the switching device;
   a voice interface responsive to said identifying signals for communicating voice information between an audio device and the switching device;
   a data interface responsive to said signals for communicating data information between a data device and the switching device, with said local data device functioning at any of a plurality of rates; and
   rate conversion logic for altering the rate of a selected portion of said information to a serial rate which corresponds to a data stream rate of one of said selected, audio, or data devices.

2. The device as recited in claim 1 wherein the rate conversion logic includes a gate circuit for extracting a data portion of a message frame received from the system node, the data portion corresponding to the signal portion to be communicated to the data device.

3. The device as recited in claim 2 further comprising synchronous and terminal rate logic operative to translate the data rate of the extracted data portion to the information rate of the data device, the synchronous and terminal rate logic including detection and counting circuitry operative to extract synchronization information from the signal portion.

4. The device as recited in claim 3 wherein the detection and counting circuitry further includes control circuitry operative to generate a clocking signal corresponding to the data rate of the extracted data portion.

5. The device as recited in claim 4 wherein the control circuitry includes a clock adjustment circuit operative to adjust the speed of the generated clock in response to fluctuations in the data rate of the extracted data portion of the message frame.

6. The device as recited in claim 3 wherein the rate logic further includes a buffer circuit for storing the extracted data portion of the signal stream, and a multiplexer circuit for gating the extracted data portion of the message frame to the data device at the clock rate of the data device.

7. The device as recited in claim 5 wherein the rate logic further includes a buffer circuit for storing the extracted data portion of the message frame, and a multiplexer circuit for gating the extracted data portion to the data device at the clock rate of the data device.

8. The device as recited in claim 1 wherein the system interface multiplexer is further operative to combine data with the voice and data signals in the message frame for communication to the system node.

9. The device as recited in claim 8 further comprising packet channel logic operative to communicate the control data portion of the message frame between the system node and the microprocessor interface.

10. The device as recited in claim 9 wherein the packet channel logic includes packet channel enable circuitry operative to form a communications path to the microprocessor interface during a portion of the signal stream dedicated to communication of control information.

11. The device as recited in claim 10 wherein the system interface further includes timing circuitry operative to generate said signal identifying said control information during the portion of the message frame from the system node dedicated to the communication of control information.

12. The device as recited in claim 1 wherein the system interface further includes timing circuitry operative to generate said signal identifying said voice information during those portions corresponding to communication of audio information.

13. The device as recited in claim 1 wherein the system interface further includes timing circuitry operative to generate said signal identifying said data information during those portions corresponding to communication of data information.

14. The device recited in claim 3 wherein the synchronous and terminal rate logic includes a data device interface and an encoding circuit, the encoding circuit being operative to structure data received from the data device in synchronous format.

15. The device as recited in claim 3 wherein the synchronous and terminal rate logic includes a data device interface for communicating data between the data device and the switching device.

16. The device as recited in claim 15 wherein the rate conversion logic further includes shift registers operative to adjust the data rate of data from the data device to conform to the data rate of the system node.

17. The device as recited in claim 15 wherein the data portion of the message frame transmitted to the system node includes a variable number of valid message bits, the number of message bits being determined by the data rate of the data device.

18. The device as recited in claim 15 wherein the data portion of the message frame received from the system node includes a variable number of valid data bits, the number of valid bits being determined in response to the data rate of the data device.

19. A switching device for transferring digital information between a system node which functions at a first rate and one or more devices which function at rates which are different than said first rate, the switching device comprising:

a system interface for communicating a signal stream including voice, data, and control information between the switching device and the system node, the system interface including a system interface multiplexer operative to combine voice signals from an external audio device, data signals from an external data device, and control information from an external microprocessor in a message frame for transmission to the system node, the system interface further including timing circuitry for receiving a message frame from the system node, the received message frame including voice, data, and control information, the timing circuitry being operative to generate separate enable signals in response to the occurrence of each of the voice, data, and control information portions of the received message frame;

a microprocessor interface responsive to said enable signals for communicating control information between the external microprocessor and the switching device;

a voice interface responsive to said enable signals for communicating voice information between the audio device and the switching device;

a data interface responsive to said enable signals for communicating data information between the external data device and the switching device, with said data device functioning at any of a plurality of rates; and rate conversion logic for altering the rate of a selected portion of said message frame received from the system node to a serial rate which corresponds to a data stream rate of one of said microprocessor controller, audio device or data device.

20. A switching device for transferring digital information between a system node which functions at a first rate and one or more devices which function at rates which are different than said first rate, the switching device comprising:

means for communicating a signal stream comprising voice and data information between the switching device and system node;

means for providing signals identifying said voice and data information;

means respsonsive to said signals for communicating voice information between an audio device and the switching device;

means responsive to said signals for communicating data information between a data device and the switching device, with the data device functioning at any of a plurality of rates; and means for altering the rate of a selected portion of said voice and data information to a serial rate which corresponds to a data stream rate of one of said audio device or data device.

21. A switching device as defined in claim 20 wherein the means for communicating includes means for combining voice signals from an audio device and data signals from a data device in a message frame for transmission to the system node.

22. A switching device as defined in claim 21 further comprising means for altering rates of the voice signals and the data signals from the devices to conform to a rate of the system node.

* * * * *